United States Patent
McCusker

(10) Patent No.: US 7,965,223 B1
(45) Date of Patent: Jun. 21, 2011

(54) FORWARD-LOOKING RADAR SYSTEM, MODULE, AND METHOD FOR GENERATING AND/OR PRESENTING AIRPORT SURFACE TRAFFIC INFORMATION

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 503 days.

(21) Appl. No.: 12/322,451

(22) Filed: Feb. 3, 2009

(51) Int. Cl.
*G01S 13/93* (2006.01)

(52) U.S. Cl. ............. 342/29; 342/33; 342/36; 340/961; 340/963

(58) Field of Classification Search .............. 342/29–37; 340/945, 951, 961, 963, 980; 701/9
See application file for complete search history.

(56) References Cited

U.S. PATENT DOCUMENTS

| | | | | |
|---|---|---|---|---|
| 5,008,825 | A * | 4/1991 | Nadkarni et al. | 701/4 |
| 5,527,003 | A * | 6/1996 | Diesel et al. | 244/195 |
| 5,593,114 | A * | 1/1997 | Ruhl | 244/183 |
| 5,657,009 | A * | 8/1997 | Gordon | 340/968 |
| 7,385,527 | B1 * | 6/2008 | Clavier et al. | 340/945 |
| 7,436,323 | B2 * | 10/2008 | Ishihara et al. | 340/951 |
| 7,675,461 | B1 * | 3/2010 | McCusker et al. | 342/179 |
| 7,783,427 | B1 * | 8/2010 | Woodell et al. | 701/301 |
| 7,834,779 | B2 * | 11/2010 | He et al. | 340/973 |
| 7,852,236 | B2 * | 12/2010 | Feyereisen et al. | 340/971 |
| 2006/0066459 | A1 * | 3/2006 | Burch et al. | 340/980 |
| 2007/0273556 | A1 * | 11/2007 | Gyde et al. | 340/945 |
| 2010/0085237 | A1 * | 4/2010 | Cornic et al. | 342/33 |

OTHER PUBLICATIONS

"MK V and MK VII Enhanced Ground Proximity Warning System (EGPWS) and Runway Awareness Advisory System (RAAS) Pilot Guide", Dec. 2003, 060-4241-000, Rev. E, Honeywell International, Inc.
RAAS (Runway Awareness and Advisory System) Operator Presentation, Mar. 20, 2008, Honeywell.
Cassell et al, "Pathprox—A Runway Incursion Alerting System", AIAA 19th Annual Avionics Systems Conference, 2000, IEEE.
Cassell, "Application of Pathprox Runway Incursion Alerting to General Aviation Operators", 24th AIAA/IEEE Digital Avionics Systems Conference, Oct. 30, 2005.
Smith et al, "System-Wide ADS-B Back-Up and Validation", 2006 Integrated Communications, Navigation & Surveillance Conference, 2006, NASA.

(Continued)

*Primary Examiner* — John B Sotomayor
(74) *Attorney, Agent, or Firm* — Matthew J. Evans; Daniel M. Barbieri

(57) ABSTRACT

A present novel and non-trivial system, module, and method for generating and/or presenting airport surface traffic information presenting using a forward-looking aircraft radar system are disclosed. A runway awareness zone is established and traffic data is acquired by a forward-looking aircraft radar system. In one embodiment, a runway awareness zone is own-ship-based. In another embodiment, a runway awareness zone is based upon data received from a navigation reference data source. An advisory data set is generated using track alignment correction information and airport surface traffic located within the runway awareness zone. Navigation data is used to determine the location of airport surface traffic. Track alignment correction information may be calculated using traffic data or navigation data. Advisory data set is provided to one or more avionics systems including a presentation system and an external communication system. Advisory data set could include visual, aural, and/or tactile information.

38 Claims, 12 Drawing Sheets

OTHER PUBLICATIONS

Smith et al, "Methods to Provide System-Wide ADS-B Back-Up, Validation and Security", 25th Digital Avionics System Conference, Oct. 15, 2006, 3D1, IEEE.

Smith et al, "ADS-X—Next Generation Surveillance Solutions", Oct. 2006, ATCA.

Moertl, "ATSA-SURF-Alert Flight Deck-Based Runway Safety Alerts", Aug. 1-2, 2007, Mitre Center for Advanced Aviation System Development (CAASD).

"Runway Incursions—A Call for Action", Air Line Pilots Association International ("ALPA") White Paper, Mar. 2007, ALPA.

* cited by examiner

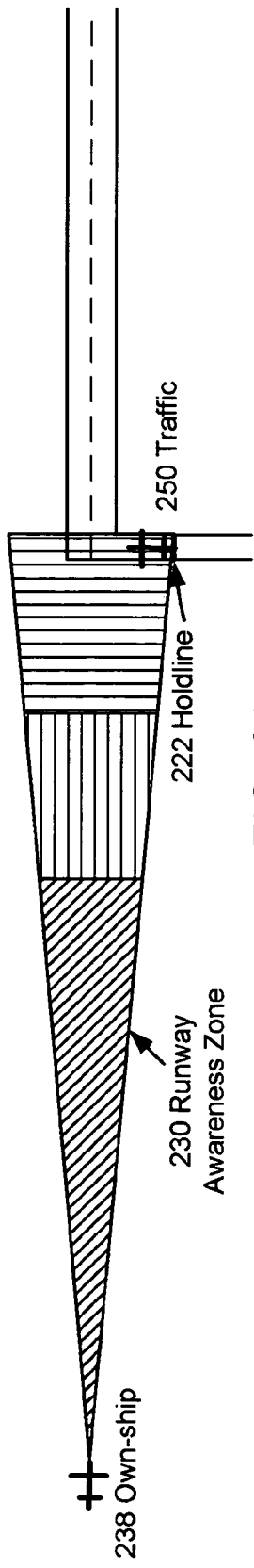
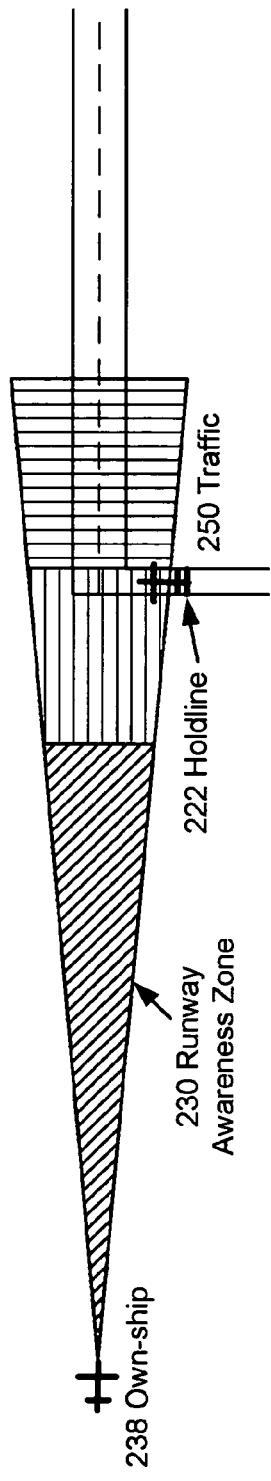
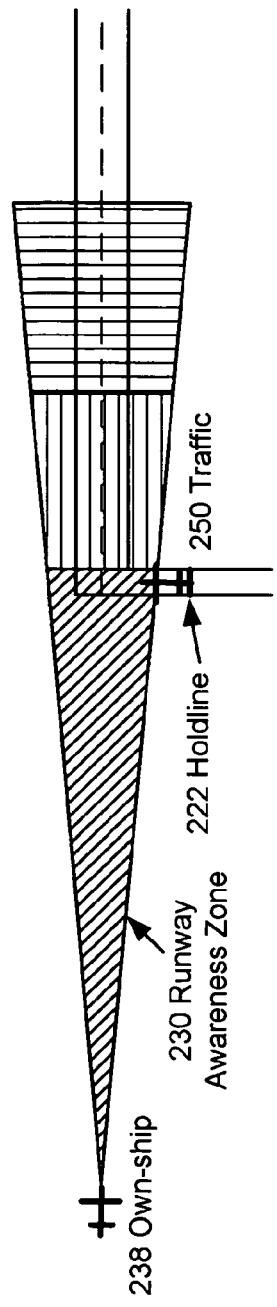
FIG. 6A
FIG. 6B
FIG. 6C

FORWARD-LOOKING RADAR SYSTEM, MODULE, AND METHOD FOR GENERATING AND/OR PRESENTING AIRPORT SURFACE TRAFFIC INFORMATION

BACKGROUND OF THE INVENTION

1. Field of the Invention

This invention pertains generally to the field of display units and/or crew alerting units that provide flight and/or ground information to the pilot or flight crew of an aircraft.

2. Description of the Related Art

Runway incursions are the most noticeable form of taxi navigation errors. Increased scrutiny by regulatory authorities has only heightened the awareness of the safety issues related to runway incursions. Taxi navigation errors cause many runway incursions and present potential collision hazards.

Systems used for presenting runway incursion and/or basic surface traffic information to a pilot for avoiding runway incursions may comprise of two basic components. One component could comprise the display of airport, airport surfaces, and/or and other information on a visual display unit, wherein such display could show ground and/or air traffic. Another component could comprise advisories such as caution and/or warning alerts that could be generated by a processor employing one or more runway incursion-related algorithms to known traffic information.

A runway incursion system may comprise of a navigation reference database for constructing airport surface maps, GPS-based own-ship positions, GPS-based traffic positions, automatic transmission of cooperative traffic positions through systems such as an automatic dependent surveillance broadcast ("ADS-B") system, and automatic re-transmission of uncooperative traffic positions through systems such as a traffic information service-broadcast ("TIS-B") system. Although these systems improve situational awareness, there are deficiencies. There is a lack of available navigation reference database for constructing airport surface maps. Also, the introduction of an ADS-B system may be slow and/or the mandated use of such system could be delayed for many years. In addition, transmission latency is inherent to both ADS-B and TIS-B systems resulting in traffic position uncertainty.

BRIEF SUMMARY OF THE INVENTION

A present novel and non-trivial system, module, and method for generating and/or presenting airport surface traffic information presenting using a forward-looking aircraft radar system are disclosed. A forward-looking aircraft radar system may be used as a sole source for generating traffic data independently of other traffic data sources such as, but is not limited to, an ADS-B system and a TIS-B system. As such, deficiencies inherent to such systems as ADS-B and TIS-B systems may be effectively traversed.

In one embodiment, a system is disclosed for generating and/or presenting runway traffic information using a forward-looking aircraft radar system. Such runway traffic information generating and/or presenting system could comprise a forward-looking aircraft radar system and a processor, where the processor could be configured to establish a runway awareness zone, receive traffic data, and generate an advisory data set based upon track alignment correction information and traffic located within the runway awareness zone. In one embodiment, a runway awareness zone could be own-ship-based, where the runway awareness zone could comprise of one or more fixed- or variably-measured boundaries and one or more advisory zones, where each advisory zone could correspond to a level of threat. In another embodiment, the track alignment correction information could be determined using data acquired by the forward-looking aircraft radar system. In another embodiment, the advisory data set could be provided to a presentation system for presenting traffic advisory information to a recipient, where the traffic advisory information could comprise, visual advisory information in the form of non-textual and textual information, aural advisory information, and/or tactile information.

In an alternative embodiment, a runway traffic information generating and/or presenting system could include a source of navigation data, where such data may be used to determine track alignment correction information. Also, navigation data could be used in the generation of the advisory data set, where the navigation data could be used in determining the latitude/longitude data associated with the traffic. In another embodiment, navigation reference data could be provided to a processor and a runway awareness zone could be established based on the navigation reference data. The processor could be configured to establish one or more advisory spacings, where each spacing could correspond to a level of threat and the advisory data set is generated to include advisory data representative of the level of threat corresponding to the traffic. In another embodiment, the advisory data set could be provided to a presentation system for presenting traffic advisory information to a recipient, where the traffic advisory information could comprise, visual advisory information in the form of non-textual and textual information, aural advisory information, and/or tactile information.

In another alternative embodiment, a runway traffic information generating and/or presenting system could include a source of navigation data and an external communication system such as a datalink system for providing traffic location data to one or more external users.

In another embodiment, a module is disclosed for generating and/or presenting runway traffic information using a forward-looking aircraft radar system. Such runway traffic information generating and/or presenting module could comprise a processor and an input communications interface for facilitating the receiving of data by the processor, where the processor could be configured to establish a runway awareness zone, receive traffic data, and generate an advisory data set based upon track alignment correction information and the traffic located within the runway awareness zone. In one embodiment, a runway awareness zone could be own-ship-based, where the runway awareness zone could comprise of one or more fixed- or variably-measured boundaries and one or more advisory zones, where each advisory zone could correspond to a level of threat. In another embodiment, the track alignment correction information could be determined using data acquired by the forward-looking aircraft radar system. In another embodiment, the module could an output communications interface for facilitating the providing of the advisory data set to a presentation system, where the traffic advisory information could comprise, visual advisory information in the form of non-textual and textual information, aural advisory information, and/or tactile information.

In an alternative embodiment, a runway traffic information generating and/or presenting module could the processor being further configured to receive navigation data, where the navigation data may be used to determine track alignment correction information. Also, navigation data could be used in the generation of the advisory data set, where the navigation data could be used in determining the latitude/longitude data associated with the traffic. In another embodiment, the processor could be further configured to receive navigation reference data, where the navigation reference data could be used to establish a runway awareness zone. The processor could be configured to establish one or more advisory spacings, where each spacing could correspond to a level of threat; the advisory data set may be generated to include advisory data representative of the level of threat corresponding to the traffic. In another embodiment, the module could include an output communications interface for facilitating the providing of the advisory data set to a presentation system, where the traffic advisory information could comprise, visual advisory information in the form of non-textual and textual information, aural advisory information, and/or tactile information.

In another alternative embodiment, a runway traffic information generating and/or presenting module could include the processor being further configured to receive navigation data and an output communications interface for facilitating the providing of the advisory data set to an external communication system such as a datalink system for providing traffic location data to one or more external users.

In another embodiment, a method is disclosed for generating and/or presenting runway traffic information using a forward-looking aircraft radar system. Such runway traffic information generating and/or presenting method could comprise establishing of a runway awareness zone, receiving traffic data acquired from a forward-looking aircraft radar system, and generating an advisory data set based upon track alignment correction information and airport surface traffic located within the runway awareness zone. In one embodiment, a runway awareness zone could be own-ship-based, where the runway awareness zone could comprise of one or more fixed- or variably-measured boundaries and one or more advisory zones, where each advisory zone could correspond to a level of threat. In another embodiment, the track alignment correction information could be determined using data acquired by the forward-looking aircraft radar system. In another embodiment, the method could include the providing of advisory data set to presentation system for presenting traffic advisory information to a recipient could be included, where the traffic advisory information could comprise, visual advisory information in the form of non-textual and textual information, aural advisory information, and/or tactile information.

In an alternative embodiment, a runway traffic information generating and/or presenting method could include receiving navigation data, where the navigation data may be used to determine track alignment correction information. Also, navigation data could be used in the generation of the advisory data set, where the navigation data could be used in determining the latitude/longitude data associated with the traffic. In another embodiment, the method could include receiving navigation reference data, where the navigation reference data could be used in establishing a runway awareness zone. One or more advisory spacings may be established, where each spacing could correspond to a level of threat; the advisory data set may be generated to include advisory data representative of the level of threat corresponding to the traffic. In another embodiment, the method could include the providing of advisory data set to a presentation system, where the traffic advisory information could comprise, visual advisory information in the form of non-textual and textual information, aural advisory information, and/or tactile information.

In another alternative embodiment, a runway traffic information generating and/or presenting method could include the receiving of navigation data and the providing the advisory data set to an external communications system.

The drawings of FIG. 3 depict some of the reference points and definitions that could be associated with a runway.

Figure 4A:
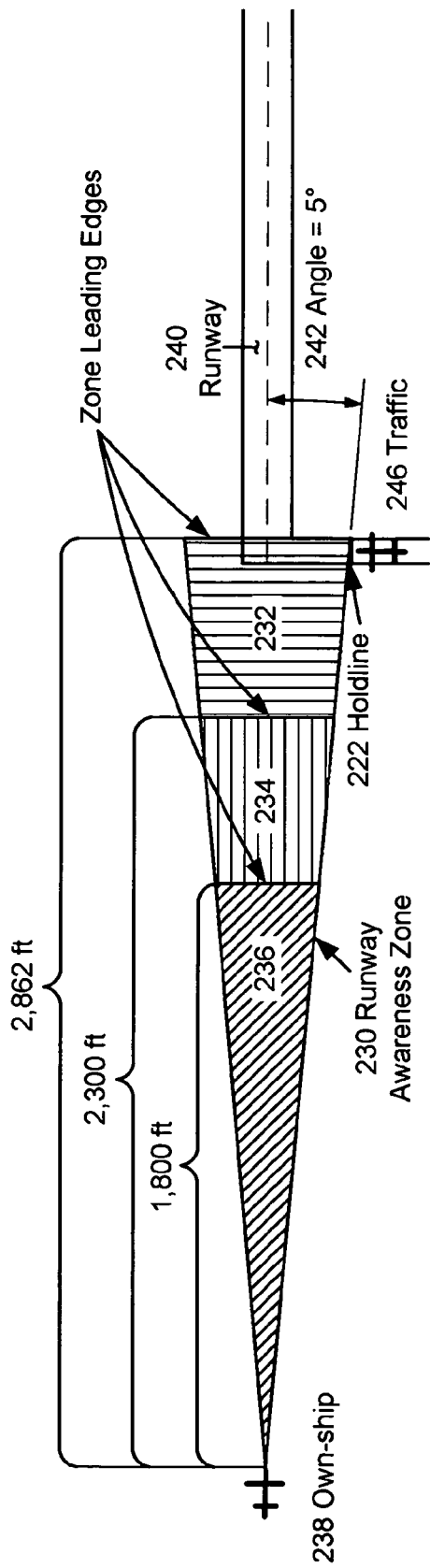
Figure 4B:
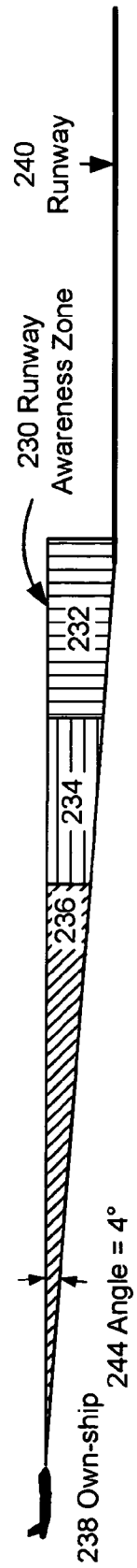
Figure 4C:
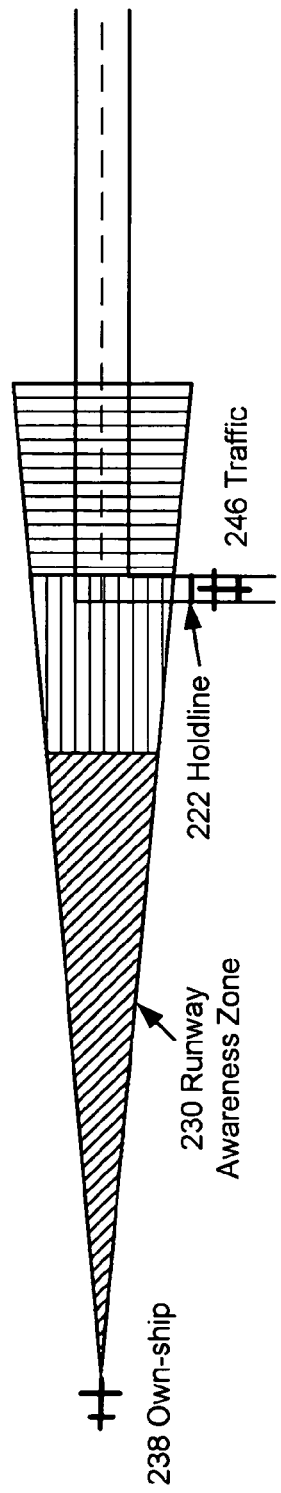

The drawings of FIG. 4 provide an example of when traffic falls outside of a runway awareness zone.

The drawings of FIG. 5 provide an example of when traffic information could be provided to a presentation system.

The drawings of FIG. 6 provide a second example of when traffic information may be provided to a presentation system.

Figure 7:
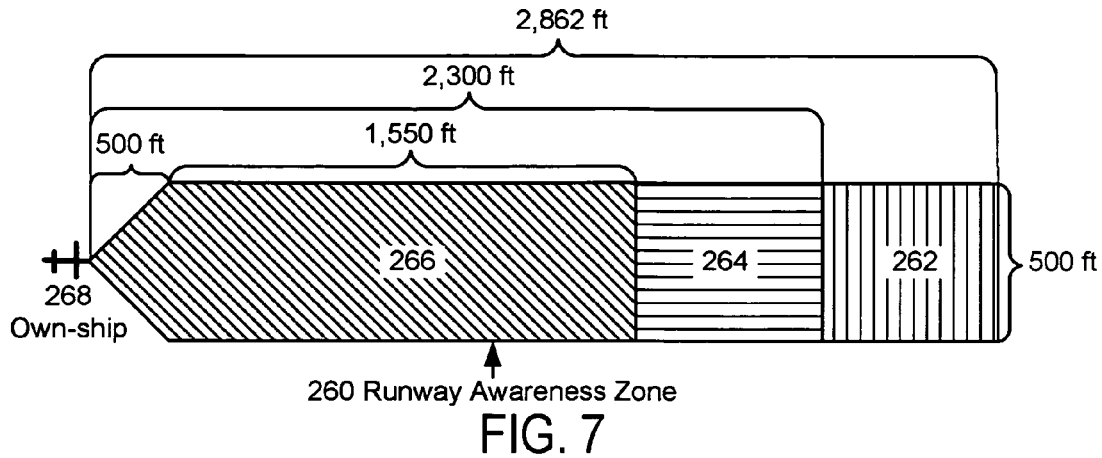

FIG. 7 provides an illustration of a runway awareness zone comprised of one or more advisory zones.

The drawings of FIG. 8 provide illustrations of a runway awareness zone comprised of one or more advisory zones and a trailing edge boundary.

The drawings of FIG. 9 illustrate an employment of a data source-based runway awareness zone.

The drawings of FIG. 10 provide a third example of when traffic information may be provided to a presentation system.

Figure 11:
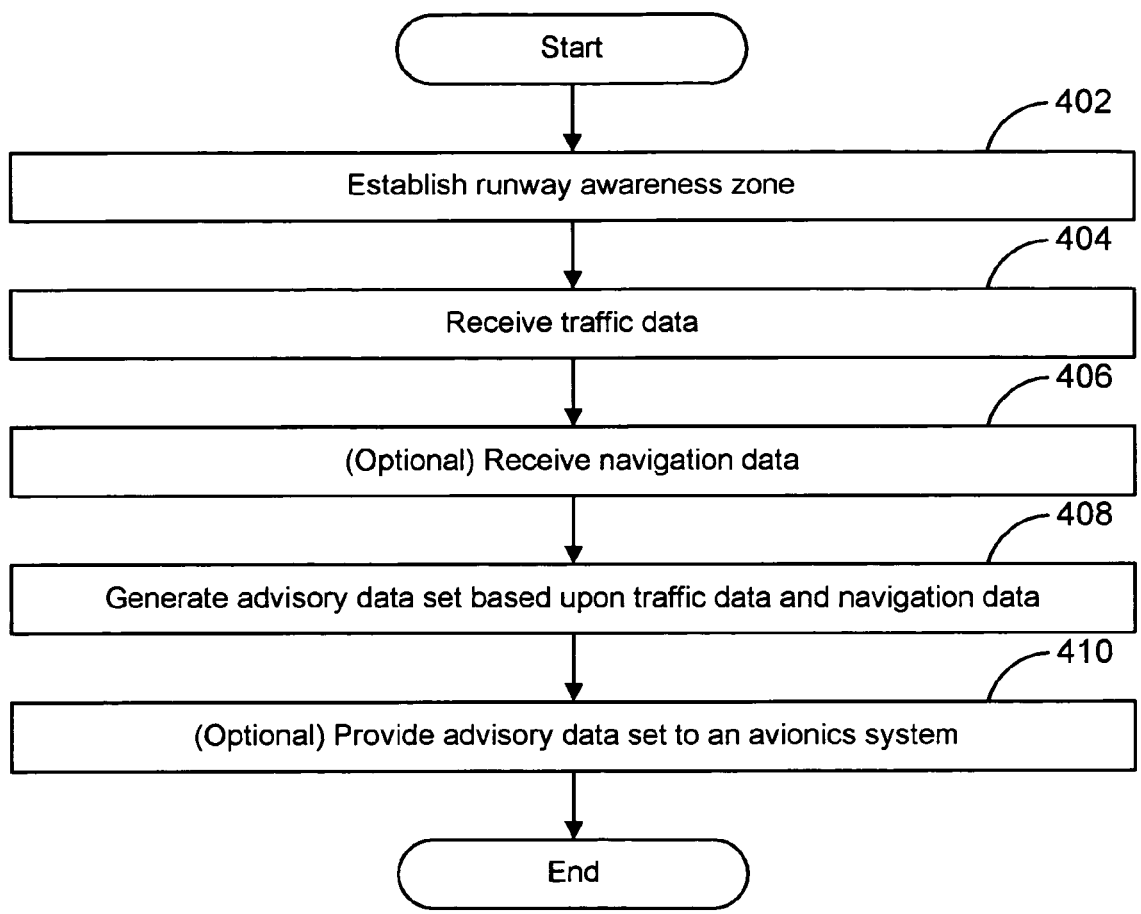

FIG. 11 depicts a flowchart of a method for generating airport surface traffic information.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
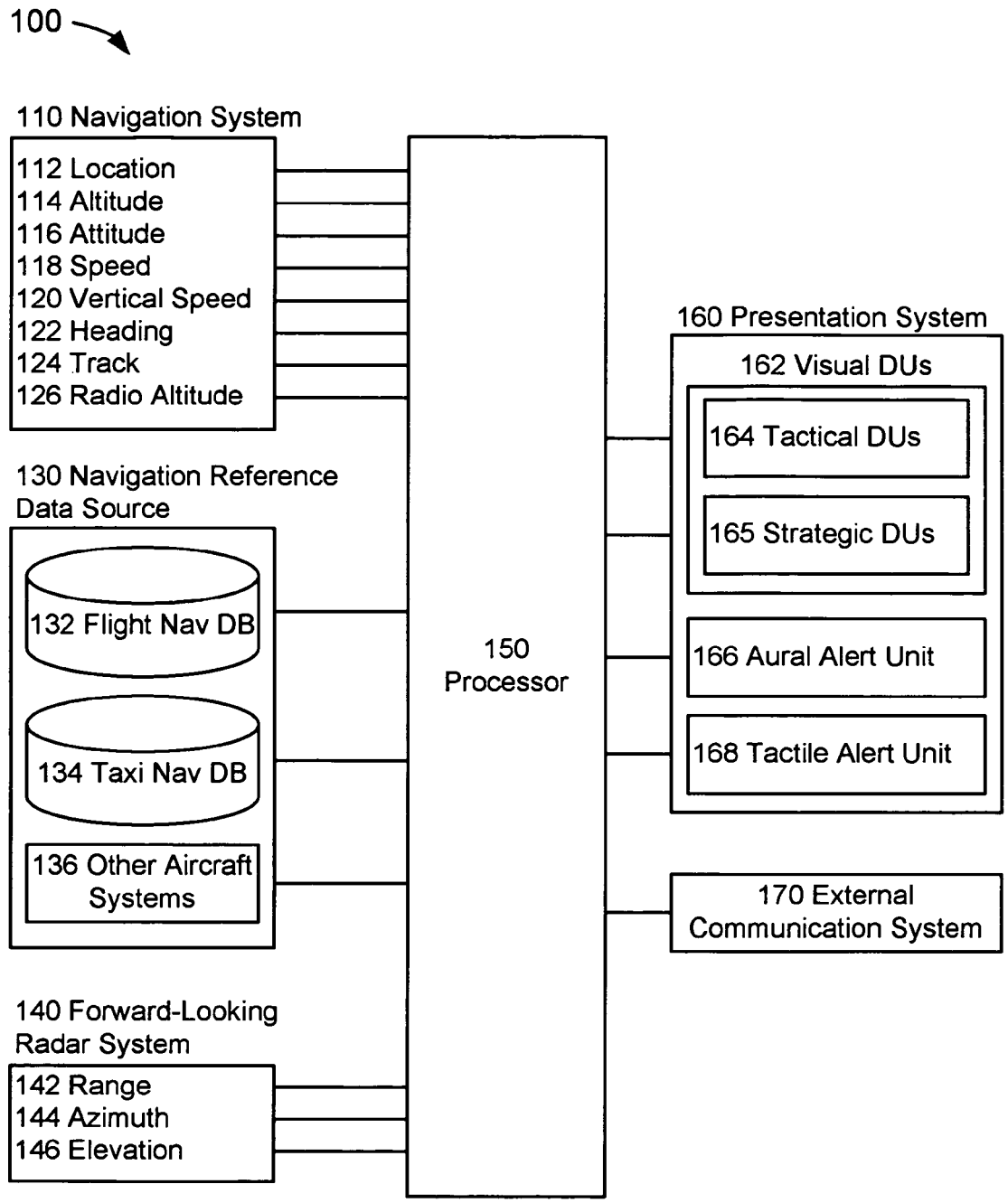
FIG. 1 depicts a block diagram of a runway traffic presentation system.

FIG. 1 depicts a block diagram of a forward-looking radar runway traffic generation and/or presentation system 100 suitable for implementation of the techniques described herein. The runway traffic presentation system 100 of an embodiment of FIG. 1 could include navigation system 110, a navigation reference data source 130, a forward-looking radar system 140, a processor 150, a presentation system 160, and an external communication system 170.

In an embodiment of FIG. 1, a navigation system 110 comprises the system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation data including, but not limited to, geographic position 112, altitude 114, attitude 116, speed 118, vertical speed 120, heading 122, track 124, and radio altitude 126. As embodied herein, track 124 could comprise actual track over the surface of the Earth or track alignment correction information such as, but not limited to, a wind correction angle and/or track angle as discussed in detail below. As embodied herein, aircraft position comprises geographic position (e.g., latitude ("lat.") and longitude ("long.") coordinates) and altitude, and direction may be derived from either geographic position, aircraft position, or both. Also, aircraft orientation may include pitch, roll, and/or yaw information related to the attitude of the aircraft. As embodied herein, navigation system data may be provided to a processor 150 for subsequent processing as discussed herein.

In an embodiment of FIG. 1, a navigation reference data source 130 could comprise any source of runway data. A navigation reference data source 130 may include, but is not limited to, a flight navigation database 132, a taxi navigation database 134, and other aircraft systems 136.

A flight navigation database 132 may contain records which provide runway data. A flight navigation database 132 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Such flight navigation database 132 could be provided by an aircraft system such as, but not limited to, an FMS, a system known to those skilled in the art.

It should be noted that data contained in any database discussed herein including a flight navigation database 132 and taxi navigation database 134 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, a temporary runway closure could be stored in a flight navigation database 132. Any database used in the embodiments disclosed herein may be a stand-alone database or a combination of databases.

A taxi navigation database 134, such as one described by Krenz et al in U.S. patent application Ser. No. 11/820,950, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

Other aircraft systems 136 could comprise a source of runway data. For example, both a terrain awareness and warning system ("TAWS") and an airspace awareness and warning system ("AAWS") may utilize airport data which may contain, in part, runway data. As embodied herein, a navigation reference data source 130 could provide runway data to a processor 150 for subsequent processing as discussed herein.

A forward-looking radar system 140 is well-known to those skilled in the art. A common example of a forward-looking radar system 140 is a weather radar system. A forward-looking radar system 140 may be comprised of, in part, a transceiver and antenna. A transceiver may transmit microwaves within a sweep zone into the atmosphere via an antenna which, in turn, produces a focused beam. The transceiver may control the direction of the beam by steering the antenna horizontally and vertically. When the signal strikes or reflects off an object such as surface traffic, part of the microwave energy is reflected back and received by the antenna. The range 142 of the object may be determined by the transceiver by measuring the elapsed time between the transmission and reception of the signal. The azimuth 144 of the object may be determined as the angle to which the antenna was steered in the horizontal direction relative to the longitudinal axis of the aircraft during the transmission/reception of the signal. The elevation or elevation angle 146 of the object may be determined as the angle to which the antenna was steered in the vertical direction relative to the longitudinal axis of the aircraft during the transmission/reception of the signal. As embodied herein, a forward-looking radar system 140 could acquire surface traffic data including, but not limited to, range 142, azimuth 144, and elevation angle 146, and based upon the acquired signals, could determine the location of surface traffic. As embodied herein, a forward-looking radar system 140 may calculate aircraft track angle directly from information contained within radar return signals. It should be noted that, although the discussion herein will be drawn to airport surface traffic, the disclosure herein are not limited to aircraft surface traffic but could include airborne traffic acquired by a forward-looking aircraft radar system, where location information and/or pilot advisories could be generated and/or presented to a pilot as discussed in detail below. For example, traffic approaching own-ship head-on could be acquired by such radar system. Then, this surface traffic data could be provided to a processor 150 for subsequent processing as discussed below.

In an embodiment of FIG. 1, a processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 150 could be a processor(s) used by or in conjunction with any other system of the aircraft including, but not limited to, a processor(s) associated with a navigation system, a traffic data source 140, a traffic alert and collision avoidance system ("TCAS"), a vision system such as, but not limited to, a synthetic vision system ("SVS"), an enhanced vision system ("EVS"), a combined SVS-EVS, or any combination thereof; for example, although depicted separately in FIG. 1, processor 150 could be included or made part of providing system 160 or any of the other separately enumerated systems.

A processor 150 may be programmed or configured to receive as input data representative of information obtained from various systems and/or sources including, but not limited to, navigation system 110, a navigation reference data source 130, and a traffic data source 140. As embodied herein, the terms "programmed" and "configured" are synonymous. A processor 150 may be electronically coupled to systems and/or sources to facilitate the receipt of input data; as embodied herein, operatively coupled may be considered as interchangeable with electronically coupled. A processor 150 may be programmed or configured to execute the methods discussed in detail below. A processor 150 may be programmed or configured to provide output data to various systems and/or units including, but not limited to, a presentation system 160. A processor 150 may be electronically coupled to systems and/or units to facilitate the providing of output data representative of a procedure. It is not necessary that a direct connection be made; instead, such receipt of input data and the providing of output data could be provided through a data bus or through a wireless network.

A presentation system 160 could be comprised of any unit which may present the pilot with visual, aural, and/or tactile indications regarding a status or condition of runway traffic including, but not limited to, visual display units 162, aural alerting unit 166, and/or tactile alerting unit 168. Visual display units 162 could be comprised of a tactical display unit(s) 164, and/or a strategic display unit(s) 165. As embodied herein, visual display units 162 may include a vision system (not shown) which generates an image data set which represents the image displayed on a display unit. Vision systems include, but are not limited to, SVS, EVS, combined SVS-EVS, or combination thereof.

A tactical display unit 164 could be any unit which presents tactical information to the crew relative to the instant or immediate control of the aircraft, whether the aircraft is in flight or on the ground. A tactical display unit 164 could be a Head-Down Display ("HDD") unit and/or a Head-Up Display ("HUD") unit. An HDD unit is typically a unit mounted to an aircraft's flight instrument panel located in front of a pilot and below the windshield and the pilot's field of vision. A HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

A tactical display unit 164 could display the same information found on a primary flight display ("PFD"), such as "basic T" information (i.e., airspeed, attitude, altitude, and heading). Although it may provide the same information as that of a PFD, a tactical display unit 164 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 164 is designed to provide flexible configurations which may be tailored to the desired configuration specified by a buyer or user of the aircraft.

Figure 2A:
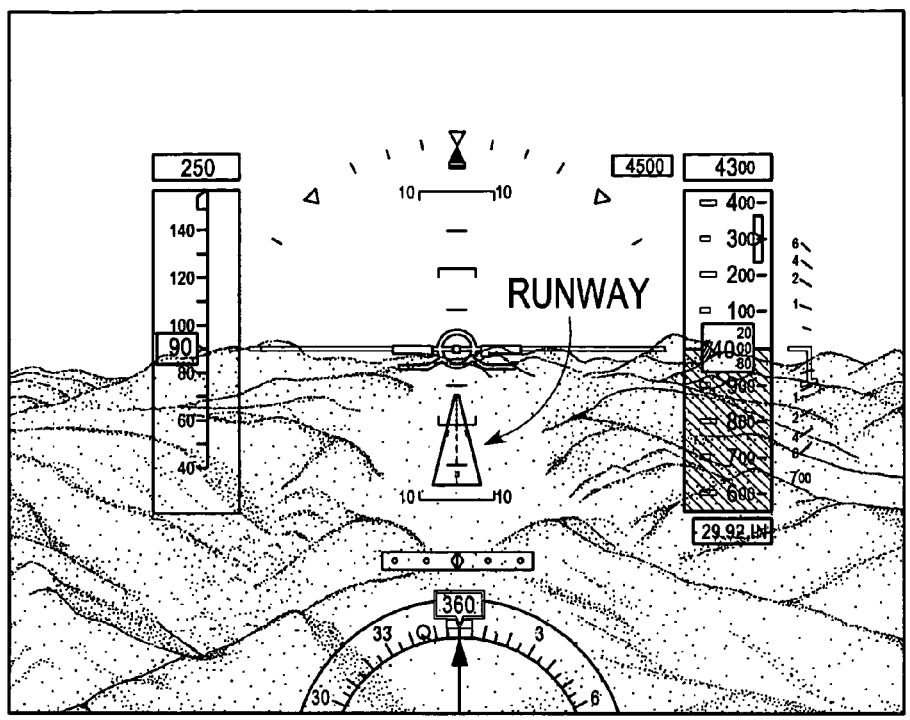
FIG. 2A provides an exemplary depiction of an HDD unit for presenting tactical information.

FIG. 2A provides an exemplary depiction of an HDD unit for presenting tactical information to the pilot or flight crew against the background of a three-dimensional image of terrain and sky; an HDD unit could be employed as a display unit in a synthetic vision system ("SVS"), an enhanced vision system ("EVS"), or combination of both ("combined SVS-EVS"). FIG. 2A provides an exemplary depiction of an HDD unit presenting an image of a runway located within a three-dimensional display of terrain. It should be noted that the tactical information depicted on the HDD unit and has been made minimal for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein.

Figure 2B:
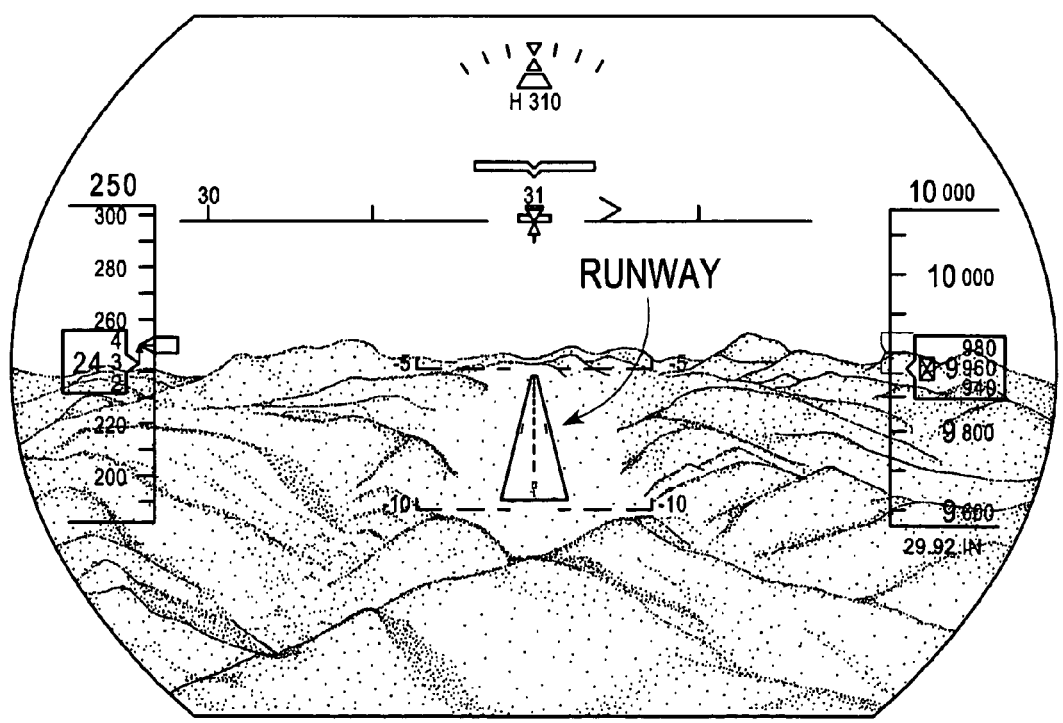
FIG. 2B provides an exemplary depiction of a HUD unit for presenting tactical information.

FIG. 2B provides an exemplary depiction of a HUD unit for presenting tactical information to the pilot or flight crew against the background of a three-dimensional image of terrain and sky; a HUD unit could be employed as a display unit in a synthetic vision system, an enhanced vision system, or combination of both. FIG. 2B provides an exemplary depiction of a HUD unit presenting an image of a runway located within a three-dimensional display of terrain. It should be noted that the tactical information depicted on the HUD unit has been made minimal for the sake of presentation and is not indicative of the plurality of indications or information with which it may be configured.

Returning to FIG. 1, a strategic display unit 165 could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed separately or simultaneously with information of other systems. In one embodiment herein, terrain information may be displayed simultaneously with weather information with no loss or a negligible loss of displayed information.

Figure 2C:
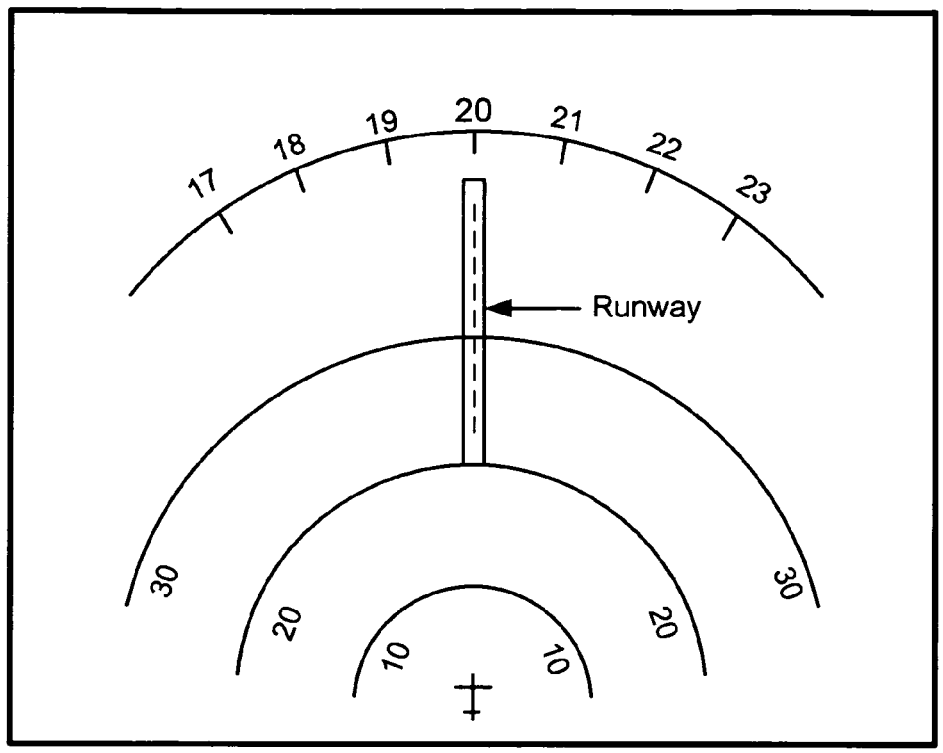
FIG. 2C provides an exemplary depiction of a strategic display unit for presenting strategic information.

FIG. 2C provides an exemplary depiction of a strategic display unit 165 for presenting strategic information to the pilot or flight crew. FIG. 2C provides an exemplary depiction of how a runway may be presented on a strategic display unit 165. It should be noted that the strategic information depicted has been made minimal for the sake of presentation and is not indicative of the plurality of indications or information with which it may be configured. Because the indications or information shown in FIG. 2C are well-known to those skilled in the art, a discussion of the specific strategic information shown in FIG. 2C is not provided herein.

Returning to FIG. 1, visual display units 162 could be capable of presenting advisory information which may be information that is projected or displayed on a cockpit display unit to present a condition, situation, or event to the pilot including other display units in addition to a tactical display unit 164 and strategic display unit 165. Advisory information may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. As embodied herein, both caution and warning alerts may be presented in combination with or simultaneous to aural alerts and/or tactile alerts. Non-alerts may be any other information not requiring immediate crew attention or awareness. Alerts may be presented visually by depicting one or more colors may be presented on a display unit indicating one or more levels of threat. For the purpose of illustration and not limitation, amber or yellow may indicate a caution alert, red may indicate a warning alert, and green or cyan may indicate a non-alert.

Figure 2D:
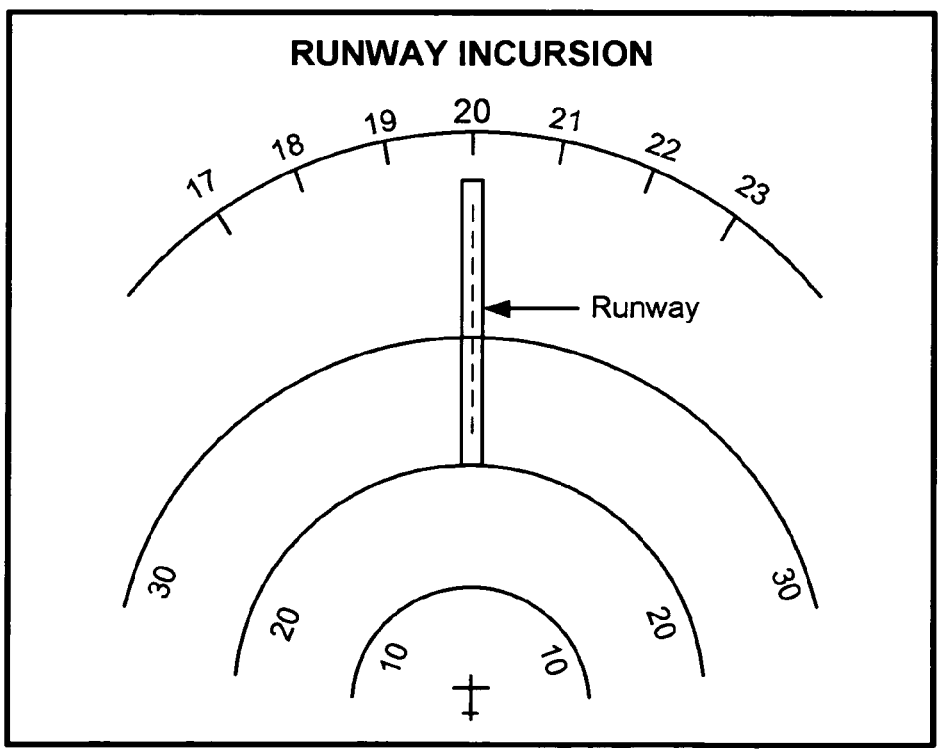
FIG. 2D provides a depiction of a strategic display unit of FIG. 2C presenting a visual alert.

In one embodiment, visual alerts could be presented in a textual form including text messages such as an amber or yellow "RUNWAY INCURSION" when the conditions for a caution alert have been met or a red "RUNWAY INCURSION" when the conditions for a warning alert have been met. In another embodiment, visual alerts could be presented in non-textual forms including, but not limited to, highlighting one or more portions of a runway depicted on a display unit corresponding to one or more partitioned sections of a runway awareness zone as discussed in detail below. In another embodiment, non-textual and textual forms could be displayed in color to indicate the level of threat, e.g., amber or yellow may indicate a caution alert and red may indicate a warning alert. In another embodiment, non-textual and textual forms could remain steady or flash intermittently, where such flashing could depend on the distance between a first aircraft ("own-ship") and another traffic, where such flashing could represent a specific range to the other traffic. FIG. 2D provides a depiction of a strategic display unit 165 of FIG. 2C presenting a textual form of a visual alert "RUNWAY INCURSION" where the color could be applicable to a level of threat (e.g., red if the alert is a warning, yellow or amber if the alert is a caution, another color appropriate for a non-alert advisory). The display of a textual form of a visual alert is not limited to a strategic display unit 165; as embodied herein, a textual form of a visual display unit could be presented on any display unit which provides visual information to a pilot.

It should be noted that the disclosure herein will discuss visual alerts which present a textual form with the words "RUNWAY INCURSION" included and aural form with the words "RUNWAY INCURSION" included. As used herein, the words should be construed as generic words for advisory information provided to the pilot and not words which limit the presentation to the recipient. For the purpose of illustration and not limitation, a non-exhaustive list of words that may be used (where such words may depend on the conditions experience by an aircraft either on the ground or in flight) could include, but are limited to, "CAUTION—TRAFFIC," "CAUTION—TRAFFIC ON RUNWAY," "CAUTION, TRAFFIC AT 12 O'CLOCK," "WARNING—TRAFFIC," "WARNING—TRAFFIC ON RUWNAY," "WARNING—TRAFFIC AT 12 O'CLOCK," "WARNING—TRAFFIC 4000 FEET AHEAD," "WARNING—GO AROUND," and "WARNING—GO AROUND—TRAFFIC 4000 FEET AHEAD."

Returning to FIG. 1, an aural alerting unit 166 may be any unit capable of producing aural alerts. Aural alerts may be discrete sounds, tones, and/or verbal statements used to annunciate a condition, situation, or event. In one embodiment, an aural alert could call out "CAUTION—RUNWAY INCURSION" when the conditions for a caution alert have been met or "WARNING—RUNWAY INCURSION" when the conditions for a warning alert have been met, and either or both could be accompanied with tonal indicators. As embodied herein, both caution and warning aural alerts could be presented in combination with or simultaneous to visual alerts and/or tactile alerts.

In an embodiment of FIG. 1, a tactile alerting unit 168 may be any unit capable of producing tactile alerts. Tactile alerts may be any tactile stimulus to present a condition, situation, or event to the pilot. As embodied herein, tactile alerts could be presented in combination with or simultaneous to visual alerts and/or tactile alerts.

In an embodiment of FIG. 1, an external communication system 170 could include one or more systems that may transmit and/or receive data from sources external to the aircraft including, but not limited to, other aircraft, ground stations, and satellites. In an embodiment of FIG. 1, data representative of traffic location and/or geographic position of surface traffic could be transmitted to external sources via an external communication system 170. As embodied herein an external communication system 170 could include, but is not limited to, an aircraft datalink system, an automatic dependent surveillance-broadcast ("ADS-B") system, a traffic information service-broadcast ("TIS-B") system, and an automatic dependent surveillance-rebroadcast ("ADS-R") system, where the latter systems could receive traffic information generated by a processor 150 as an alternate or supplemental source of traffic data that is transmitted externally.

Figure 3A:
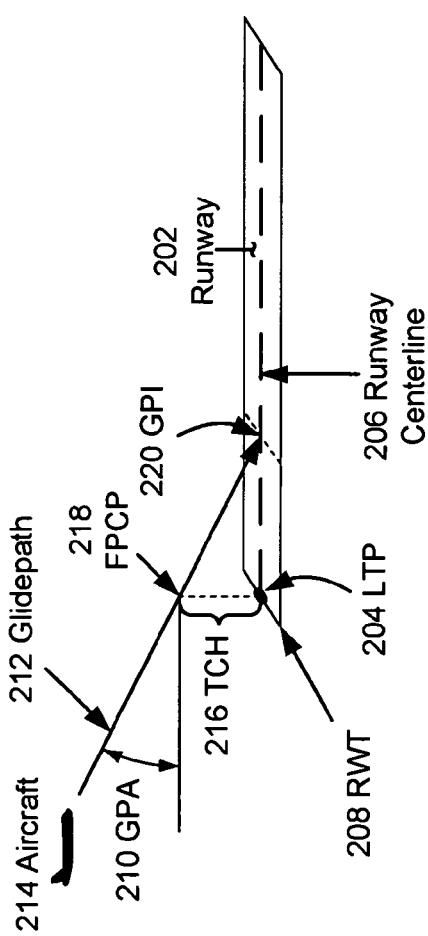

The drawings of FIG. 3 depict some of the reference points and definitions that could be associated with a runway 202, and data representative of these points and definitions may be stored in one or more navigation reference data sources 130. As shown in FIG. 3A, a runway Landing Threshold Point ("LTP") 204 (which could also be called a runway threshold point) may be a three dimensional point at an intersection of the runway centerline 206 and the runway threshold ("RWT") 208; the direction of a runway centerline 206 from an LTP 204 may be measured in reference to magnetic north using a magnetic bearing. In one embodiment, an LTP 204 could be defined using lat., longitude, and elevation derived from government sources. In another embodiment, a geoid height could be included in definition, where a geoid could be considered to be an equipotential surface that is everywhere normal to the direction of gravity and would coincide with the mean ocean surface of the Earth, if the oceans were in equilibrium, at rest, and extended through the continents. The surface of a geoid may be approximated using a mathematically-defined reference ellipsoid employed in a geodetic system. The height of a geoid ("GH") may be measured relative to the ellipsoid, and it may be positive if it is above the reference ellipsoid and negative if it is below.

A glidepath angle ("GPA") 210 may be the angle of a specified glidepath 212 (or final approach descent path) to be flown by an aircraft 214 relative to an Approach Surface Base Line (not shown) at the RWT 208, where such base line may be considered as a horizontal line tangent to the Earth. A Threshold Crossing Height ("TCH") 216 may be the height of the GPA 210 above the LTP 204. A Flight Path Control Point ("FPCP") 218 may be an imaginary point above the LTP 204 at the TCH 216 from which the glidepath mathematically emanates. A Ground Point of Intercept ("GPI") 220 may be a point in the vertical plane where the final approach descent path 212 intercepts the ASBL; GPI 220 could located within a touchdown zone of a runway 202.

Figure 3B:
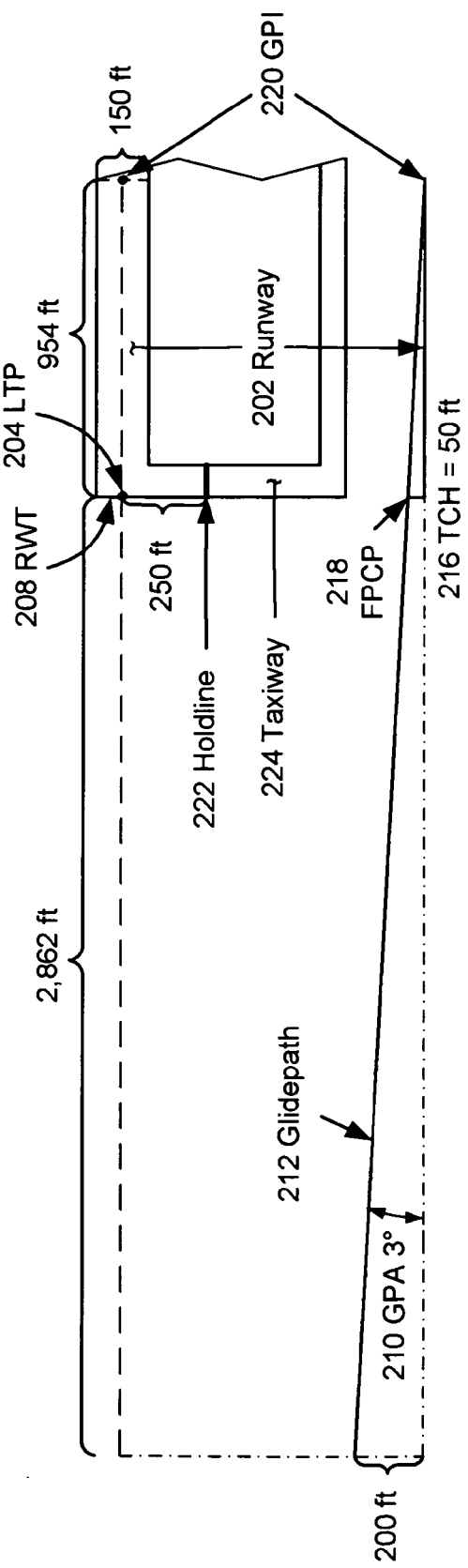

FIG. 3B depicts top and profile views of an exemplary depiction of some of the reference points and definitions of FIG. 3A along with values to indicate dimensions associated with runway 202; although these dimensions will provide basis for the examples of drawings of FIGS. 4 through 6, inclusive, the embodiments herein are not restricted to these dimensions. As depicted, a glidepath 212 is shown to a GPA 210 of 3 degrees and a TCH 216 of 50'. Given these values, a GPI 220 may be calculated to be 954 feet from LTP 204 or RWT 208, and a distance to a point 200 feet above a LTP 204 may be calculated as approximately 2,862 feet; it should be noted that these calculations have been approximated without accounting for the curvature of the Earth. The width of runway 202 is 150 feet, and the distance from runway centerline 206 and to a holdline 222 of taxiway 224 is 250 feet.

The placement of holdlines are provided by the United States Federal Aviation Administration ("FAA") and found in Advisory Circular AC 150/5300-13, an FAA Advisory Circular entitled "Airport Design" dated Sep. 29, 1989 and incorporating subsequent changes 1 through 13, inclusive. At the time of this writing, the Advisory Circular may be obtained on the Internet at http://www.faa.gov/airports_airtraffic/airports/resources/advisory_circulars/ or http://rgl.faa.gov/Regulatory_and_Guidance_Library/rgAdvisoryCircular.nsf/MainFrame?OpenFrameSet. Although the Advisory Circular provides specific distances, those skilled in the art will readily acknowledge that aviation regulatory authorities such as the FAA may modify standards with subsequent changes, amendments, or revisions. Although the discussion of holdlines will be drawn to the Advisory Circular, the embodiments are neither limited nor restricted to runways of the United States or those with governing oversight of the FAA. It is known to those skilled in the art that aviation governing authorities throughout the world may have developed standards unique to their respective jurisdictions which may or may not employ similar standards. The embodiments disclosed herein could include all standards or schemes that could be developed or employed. The embodiments and discussion herein with respect to holdlines are illustrations intended solely to provide examples and are in no way intended to be limited to those discussed and presented herein.

At airports with operating control towers, holdlines may identify the location on a taxiway where a pilot is to stop when he or she does not have clearance to proceed onto the runway. At airports without operating control towers, these holdlines may identify the location where a pilot could assure there is no adequate separation with other aircraft before proceeding onto the runway. Holdlines standards stated in the Advisory Circular are distances measured from a runway centerline to an intersecting taxiway centerline and based on approach visibility minimums, airplane design group, and aircraft category assigned to the runway. Applicable visibility minimum criteria depend on whether the runway has lower than three-quarter (¾) mile approach visibility minimums have been adopted for the runway. Airplane design group criteria is associated with runway width and may be divided into six (6) groups wherein each group is determined by tail size or wingspan of the aircraft for which the runway was designed. Category of aircraft criteria may be divided into one of five (5) categories wherein each category is determined by a stall speed of a specifically-configured aircraft for which the runway was designed.

The advantages and benefits of the embodiments discussed herein may be illustrated by showing examples of how situational awareness of a runway environment is enhanced using traffic information acquired from a forward-looking radar system 140 and a runway awareness zone established by a processor programmed or configured by a manufacturer or end-user. The drawings of FIGS. 4 through 6, inclusive, illustrate an employment of an own-ship-based runway awareness zone as embodied herein. As depicted in FIGS. 4A and 4B, a runway awareness zone 230 may be comprised of one or more advisory zones 232, 234, and 236. Each advisory zone could correspond to a non-alert and/or one or more alerts, where such alerts may be based on level of threat or conditions requiring immediate crew awareness or attention. As used in the following discussion, advisory zone 232 could correspond to a non-alert zone, advisory zone 234 could correspond to a caution alert zone, and advisory zone 236 could correspond to a warning alert zone. In the following discussion, non-alert advisory zone 232, caution alert advisory zone 234, and warning alert advisory zone 236 are illustrated with fills comprising vertical lines, horizontal lines, and diagonal lines, respectively.

As depicted in FIG. 4A, an aircraft or own-ship 238 is approaching a runway 240. As embodied herein, own-ship 238 may provide a reference point from where one or more boundaries of a runway awareness zone 230 could be established. A lateral boundary of a runway awareness zone 230 could correspond to a fixed angular measurement originating from the front of own-ship 238. As depicted in FIG. 4A, angle 242 has been set to 5 degrees measured from the longitudinal axis of own-ship 238 (which is an axis assumed for the purpose of discussion only to coincide with the zero azimuth measurement of a radar system 140). The value of 5 degrees is an approximate angular measurement between a LTP and a holdline that is 250 feet from a runway centerline when an aircraft is located on an extended runway centerline approximately 2,862 feet from the LTP. For the purpose of illustration, the longitude axis of own-ship 238 coincides with an extended runway centerline.

A longitudinal boundary of a runway awareness zone and/or an advisory zone could correspond to a fixed measurement originating from the front of own-ship 238. As depicted in FIG. 4A, the longitudinal distance between own-ship 238 and a leading edge of the runway awareness zone 230 (or non-alert zone 232) is 2,862 feet. Also, the longitudinal distances between own-ship 238 and leading edges of the advisory zones 234 and 236 are 2,300 feet and 1,800 feet, respectively. It should be noted that, although the leading edges of the zones are depicted as straight lines, one or more leading edges could comprise curved lines such as, but not limited to, an arc having a fixed radius when measured from the front of own-ship 238.

A vertical boundary of a runway awareness zone and/or an advisory zone could correspond to a fixed measurement originating from the front of own-ship 238. A vertical boundary of a runway awareness zone 230 could correspond to a fixed angular measurement originating from the front of own-ship 238. As depicted in FIG. 4B, angle 244 has been set to 4 degrees measured from the longitudinal axis of own-ship 238 (which is an axis assumed for the purpose of discussion only to coincide or align with the zero elevation measurement of a radar system 140). The value of 4 degrees is an approximate angular measurement between own-ship 238 and a LTP when an aircraft is located on an extended runway centerline approximately 2,862 feet from the LTP and a GPA of 3 degrees. For the purpose of illustration, the longitude axis of own-ship 238 coincides or aligns with an extended runway centerline.

It is known to those skilled in the art that the values of 200 feet and 3 degrees shown in FIG. 3B could be considered standard measurements of a decision height ("DH") and glide slope, respectively, set by the FAA for establishing a precision instrument approach procedure. Although the embodiments herein are not limited to the values used in the examples provided herein, the discussion of the traffic information and advisories generated between the DH and the RWT using a runway awareness zone illustrates the advantages gained by using immediate traffic returns of a radar system 140 over an inherent latency of other traffic surveillance systems in a critical phase of flight where traffic 246 such as an aircraft on the surface could stray beyond a holdline as own-ship 238 is about to land, creating a unsafe condition leading to possible tragic consequences.

It should be noted that, for the sole purpose of illustration and not limitation, the longitudinal axis of the own-ships discussed herein will assume to coincide or align with a track. Those skilled in the art understand that this may not occur in flight. For example, the presence of a cross-wind could create a situation where the longitudinal axis and/or aircraft heading 122 do not coincide or align with the track 124 of own-ship. In such event, track alignment correction information such as, but not limited to, a wind correction angle may be determined and could be applied to an own-ship-based runway awareness zone and/or may be corrected. In one embodiment, the forward-looking radar system may calculate aircraft track angle directly from information contained within radar return signals. Alternatively, in another embodiment, aircraft track angle may be computed by a navigation system.

The drawings of FIG. 4 provide an example of when traffic falls outside of a runway awareness zone. As shown in FIGS. 4A and 4B, aircraft or traffic 246 has held short of holdline 222 and falls outside of the boundaries of a runway awareness zone 230 as own-ship 238 approaches the runway. Because traffic 246 does not fall within the runway awareness zone 230, traffic advisory information does not have to be generated and/or provided to a pilot through a presentation system.

Figure 5A:
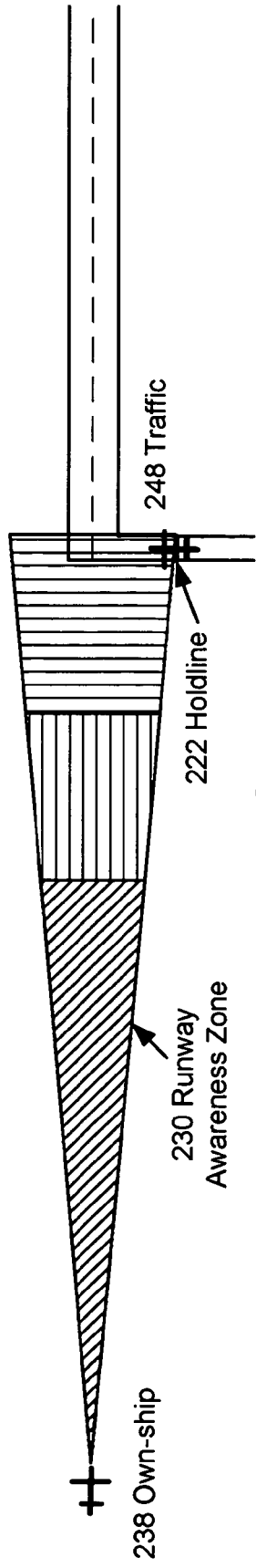
Figure 5B:
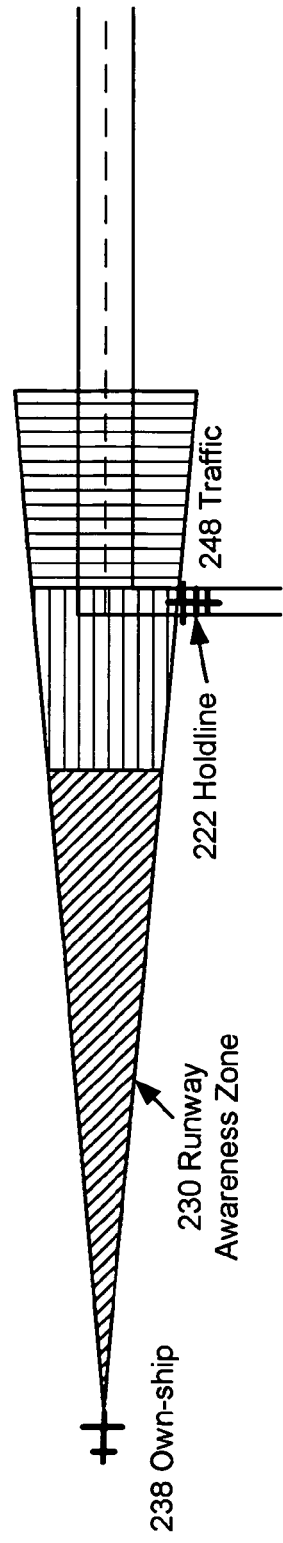
Figure 5C:
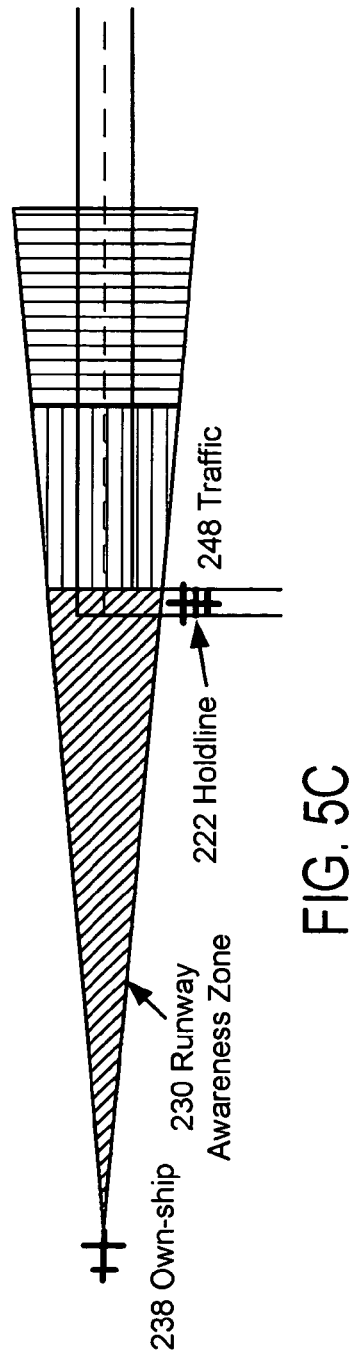

The drawings of FIG. 5 provide an example of when traffic information could be provided to a presentation system as own-ship 238 approaches a runway. As shown in FIG. 5A, traffic 248 has crossed over holdline 222 and falls within the boundary of a non-alert advisory zone (shown with vertical lines); the location of traffic 248 will remain the same for FIGS. 5B and 5C. Advisory data representative of traffic advisory information may be generated using azimuth and/or range data acquired from a forward-looking radar system 140 and provided to a presentation system for presenting a pilot with visual, non-textual information such as, but not limited to, symbology depicting the location of traffic on a visual display unit, where such symbology could be displayed in any color applicable for a non-alert advisory. Similarly, advisory data may be generated and provided to a presentation system for presenting a pilot with visual, textual information on a visual display unit; for example, an applicably-colored text message "RUNWAY TRAFFIC—2,800 FEET AHEAD" could be presented visually to a pilot. As embodied herein, non-textual and textual forms could remain steady or flash intermittently, where such flashing could depend on the distance between own-ship and traffic, where such flashing could represent a specific distance or range to traffic. In addition, advisory data may be generated and provided to a presentation system for presenting a pilot with an aural non-alert advisory using an aural alert unit 166; for example, a message "ADVISORY RUNWAY TRAFFIC—2,800 FEET AHEAD" could be presented aurally to a pilot.

It should be noted that traffic location and/or geographic position of traffic may be determined by a processor when radar azimuth and range data of traffic, aircraft position and/or aircraft location information of own-ship, and/or track alignment correction information have been provided or determined. If traffic is located within a runway awareness zone, advisory data representative of traffic advisory information of traffic may be generated such that advisory data could be provided to one or more avionics systems.

In one embodiment, advisory data may be provided to a presentation system for presenting visual, non-textual information such as, but not limited to, highlighting or illuminating a runway depicted on a visual display unit, where such highlight or illumination could be displayed in any color applicable for the advisory. In another embodiment, advisory data may be provided to a presentation system for presenting visual, non-textual information such as, but not limited to, highlighting or illuminating part of a runway depicted on a visual display unit corresponding to a partitioned runway awareness zone occupied by traffic, where such highlight or illumination could be displayed in any color applicable for the advisory. In another embodiment, advisory data may be transmitted to other aircraft through an aircraft datalink system, thereby providing a source of traffic data independently of other traffic data sources such as, but is not limited to, an ADS-B system, a TIS-B system, an ADS-R system, or any combination thereof. In another embodiment, advisory data may be transmitted to other aircraft by providing an ADS-B system, a TIS-B system, and/or an ADS-R system with such data as an alternate or supplemental source.

As shown in FIG. 5B, approaching own-ship 238 has moved closer to the runway, and the location of traffic 248 falls within the boundary of the caution alert advisory zone (filled with horizontal lines). Advisory data representative of traffic advisory information may be generated using azimuth and/or range data acquired from a forward-looking radar system 140 and provided to a presentation system for presenting a pilot with visual, non-textual information such as, but not limited to, symbology depicting the location of traffic on a visual display unit, where such symbology could be displayed in a color applicable for a caution alert (e.g., amber or yellow). Similarly, advisory data may be generated and provided to a presentation system for presenting a pilot with visual, textual information on a visual display unit; for example, an amber or yellow text message "RUNWAY TRAFFIC—2,300 FEET AHEAD" could be presented visually to a pilot. In addition, advisory data may be generated and provided to a presentation system for presenting a pilot with an aural alert using an aural alert unit 166; for example, a message "CAUTION RUNWAY TRAFFIC—2,300 FEET AHEAD" could be presented aurally to a pilot.

As shown in FIG. 5C, approaching own-ship 238 has moved closer to the runway, but the location of traffic 248 has fallen outside of the runway awareness zone 230 of own-ship 238. Because traffic 248 does not fall within the runway awareness zone 230, traffic advisory information does not have to be generated and/or provided to a pilot through a presentation system.

The drawings of FIG. 6 provide another example of when traffic information may be provided to a presentation system as own-ship 238 approaches a runway. As shown in FIG. 6A, traffic 250 has moved further away from the holdline 222 than shown in the drawings of FIG. 5; the location of traffic 250 will remain the same for FIGS. 6B and 6C. Advisory data representative of traffic advisory information may be generated using azimuth and/or range data acquired from a forward-looking radar system 140 and provided to a presentation system for presenting a pilot with visual, non-textual information such as, but not limited to, symbology depicting the location of traffic on a visual display unit, where such symbology could be displayed in any color applicable for a non-alert advisory. Similarly, advisory data may be generated and provided to a presentation system for presenting a pilot with visual, textual information on a visual display unit; for example, an applicably-colored text message "RUNWAY TRAFFIC—2,800 FEET AHEAD" could be presented visually to a pilot. In addition, advisory data may be generated and provided to a presentation system for presenting a pilot with an aural non-alert advisory using an aural alert unit 166; for example, a message "ADVISORY RUNWAY TRAFFIC—2,800 FEET AHEAD" could be presented aurally to a pilot.

As shown in FIG. 6B, approaching own-ship 238 has moved closer to the runway, and the location of traffic 248 falls within the boundary of the caution alert advisory zone (filled with horizontal lines). Advisory data representative of traffic advisory information may be generated using azimuth and/or range data acquired from a forward-looking radar system 140 and provided to a presentation system for presenting a pilot with visual, non-textual information such as, but not limited to, symbology depicting the location of traffic on a visual display unit, where such symbology could be displayed in a color applicable for a caution alert (e.g., amber or yellow). Similarly, advisory data may be generated and provided to a presentation system for presenting a pilot with visual, textual information on a visual display unit; for example, an amber or yellow text message "RUNWAY TRAFFIC—2,300 FEET AHEAD" could be presented visually to a pilot. In addition, advisory data may be generated and provided to a presentation system for presenting a pilot with an aural alert using an aural alert unit 166; for example, a message "CAUTION RUNWAY TRAFFIC—2,300 FEET AHEAD" could be presented aurally to a pilot.

As shown in FIG. 6C, approaching own-ship 238 has moved closer to the runway, and the location of traffic 250 falls within the boundary of the warning alert advisory zone (filled with diagonal lines). Advisory data representative of traffic advisory information may be generated using azimuth and/or range data acquired from a forward-looking radar system 140 and provided to a presentation system for presenting a pilot with visual, non-textual information such as, but not limited to, symbology depicting the location of traffic on a visual display unit, where such symbology could be displayed in a color applicable for a warning alert (e.g., red). Similarly, advisory data may be generated and provided to a presentation system for presenting a pilot with visual, textual information on a visual display unit; for example, a red text message "RUNWAY TRAFFIC—1,800 FEET AHEAD" could be presented visually to a pilot. In addition, advisory data may be generated and provided to a presentation system for presenting a pilot with an aural alert using an aural alert unit 166; for example, a message "WARNING RUNWAY TRAFFIC—1,800 FEET AHEAD" could be presented aurally to a pilot.

It should be noted that, although the boundaries of the runway awareness zone and/or advisory zones of the drawings of FIGS. 4 through 6 have been drawn as fixed measurements originating from the front of own-ship 238, the embodiments herein may not limited to and/or include fixed measurements. As embodied herein, longitudinal boundaries may be established using variable measurements where such variables could include, but are not limited to, time and/or speed. A manufacturer or end-user may configure a leading edge boundary of a runway awareness zone and/or advisory zone as a function of time spacing between an own-ship and a target. For example, spacing of 90 seconds may be selected by a manufacturer or end-user for the generation and/or presentation of a first advisory level (e.g., non-alert advisory), 45 seconds for a second alert advisory (e.g., caution), and 15 seconds for a third alert advisory (e.g., warning). For an own-ship operating at a speed of 120 knots, boundaries corresponding to the different levels of advisories would be equivalent to 3.0 nautical miles ("NM"), 1.5 NM, and 0.5 NM, respectively. For an own-ship operating at a speed of 140 knots, corresponding boundaries would be equivalent to 3.5 NM, 1.75 NM, and 0.58 NM, respectively. For an own-ship operating at a speed of 90 knots, corresponding boundaries would be equivalent to 2.25 NM, 1.13 NM, and 0.42 NM, respectively. Using the boundary distances of 2,862 feet, 2300 feet, and 1800 feet illustrated in FIGS. 4 through 6, a manufacturer or end-user may select spacing of 14.13 seconds, 11.36 seconds, and 8.89 seconds for non-alert, caution, and warning advisory zones, respectively, for an aircraft operating at a speed of 120 knots.

It should be noted that, although the boundaries of the runway awareness zone and/or advisory zones of the drawings of FIGS. 4 through 6 have been drawn as a fixed shape originating from the front of own-ship 238, the embodiments herein may not limited to and/or include fixed shapes. Instead, a manufacturer or end-user may configure a runway awareness zone and/or advisory zones to any shape which may be used for the purposes of establishing a zone from within which traffic may be determined and advisory information may be generated and presented to a pilot or flight crew.

The drawings of FIGS. 7 and 8 provide merely two examples from a plethora of shapes that a manufacturer or end-user may configure for establishing boundaries an own-ship-based runway awareness zone and/or runway advisory zones. These shapes are intended for the purpose of illustration and not limitation. FIG. 7 provides an illustration of a runway awareness zone 260 comprised of one or more advisory zones 262, 264, and 266. As depicted, runway awareness zone 260 has a longitudinal boundary originating from the front of own-ship and extending 2,862 feet from the front of own-ship 268 and a lateral boundary having both a fixed angular measurement and fixed linear measurement originating from the front of own-ship 268. As depicted, the lateral boundary has a fixed angular measurement until reaching a point 500 feet in front of own-ship and a fixed linear measurement of 500 feet thereafter for another 2,362 feet until reaching the leading edge of the runway awareness zone 260 (or non-alert zone 262). Also, the longitudinal distances between own-ship 262 and leading edges of the advisory zones 264 and 266 are 2,300 feet and 1,800 feet, respectively. It should be noted that, although the leading edges of the zones are depicted as straight lines, one or more leading edges could comprise curved lines such as, but not limited to, an arc having a fixed radius when measured from the front of own-ship 268.

The drawings of FIG. 8 provide illustrations of a runway awareness zone 270 comprised of one or more advisory zones 272, 274, and 276 and a trailing edge boundary, where the distance between own-ship 278 and a trailing edge varies. For the drawings of FIG. 8, the trailing edge of runway awareness zone 270 has been selected by a manufacturer or end-user as coinciding with a LTP at the edge of a runway. As embodied herein, a reference point may be used for determining a location of a trailing edge, where a selection of such reference point may be made from one or more inputs. For example, one or more inputs provided by sources such as, but not limited to, a navigation system 110 and navigation reference data source 130 may used for determining the location of own-ship 278 from the reference point. For example, if a fixed glide path and height above the LTP are assumed, then the distance to the trailing edge may be estimated if height above ground is provided by a navigation system 110. In another embodiment, if the location of the aircraft and LTP are known, then the distance to the trailing edge may be actually calculated if the locations are provided by a navigation reference data source 130.

Figure 8A:
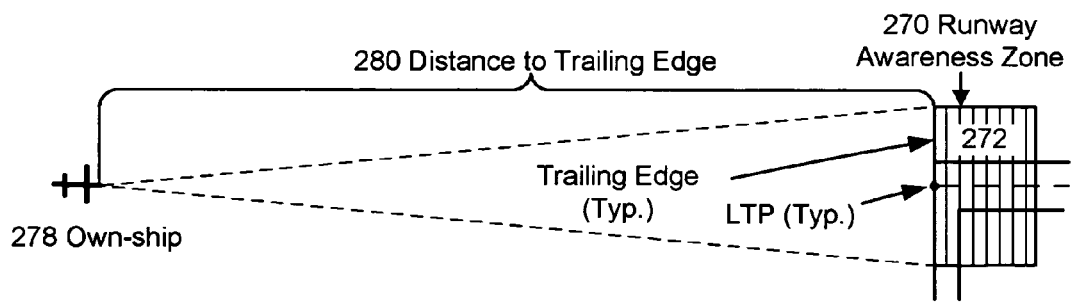

As shown in FIG. 8A, own-ship 278 is approaching a runway, and a non-alert advisory zone 272 has crossed over the edge of the runway or LTP. As own-ship 278 continues on its flight path, the distance to trailing edge 280 of a non-alert advisory zone 272 decreases. Depending on one or more available inputs, distance to trailing edge 280 of a runway awareness zone 270 and/or runway non-alert advisory zone 272 may be determined.

Figure 8B:
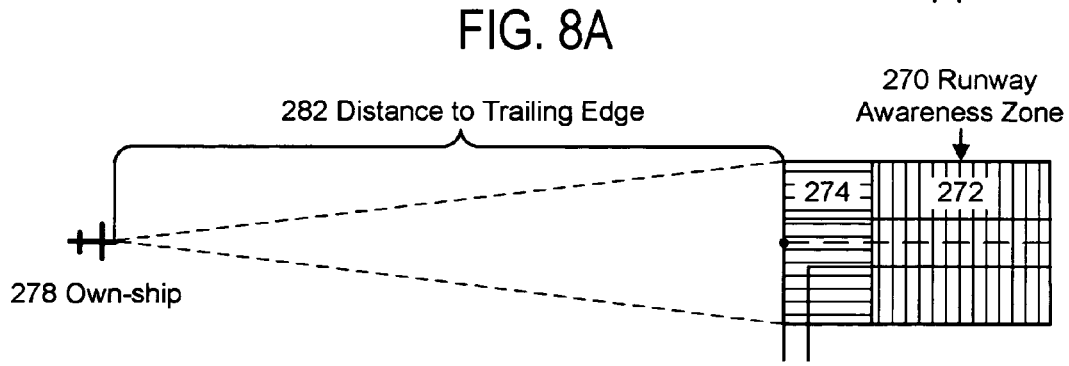

As shown in FIG. 8B, own-ship 238 has moved closer to the runway, and a caution alert advisory zone 274 has crossed over the edge of the runway or LTP. As own-ship 278 continues on its flight path, the distance to trailing edge 282 of a caution alert advisory zone 274 decreases. Depending on one or more available inputs, distance to trailing edge 282 of a runway awareness zone 270 and/or runway a caution alert advisory zone 274 may be determined.

Figure 8C:
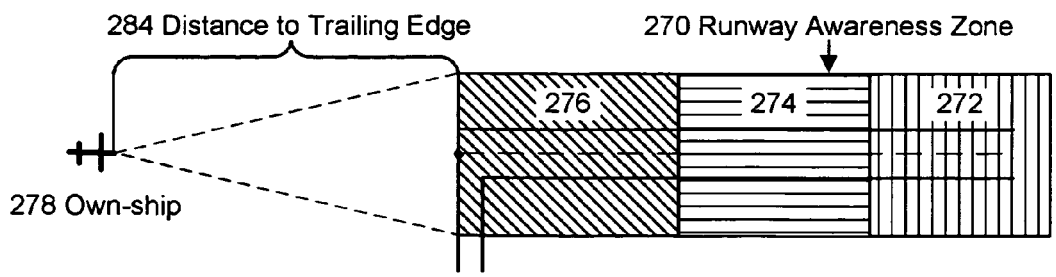

As shown in FIG. 8C, own-ship 238 has moved closer to the runway, and a warning alert advisory zone 276 has crossed over the edge of the runway or LTP. As own-ship 278 continues on its flight path, the distance to trailing edge 284 of a warning alert advisory zone 276 decreases. Depending on one or more available inputs, distance to trailing edge 284 of a runway awareness zone 270 and/or runway a warning alert advisory zone 276 may be determined.

The advantages and benefits of the embodiments discussed herein may be illustrated by showing examples of how situational awareness of a runway environment is enhanced using traffic information acquired from a forward-looking radar system 140 and a runway awareness zone established using a navigation reference data source 130. The drawings of FIG. 9 illustrate an employment of a data source-based runway awareness zone as embodied herein. For the purpose of discussion only, Runways 8-26 of Rifle/Garfield County Regional Airport ("RIL") in the State of Colorado, United States has been selected for discussion. As discussed herein, the runway depiction and runway data information may have been modified for the sake of illustration and is not suitable for navigation. For example, the runway is not drawn to scale and the runway markings have been modified from the actual markings for the sake of brevity.

Figure 9A:
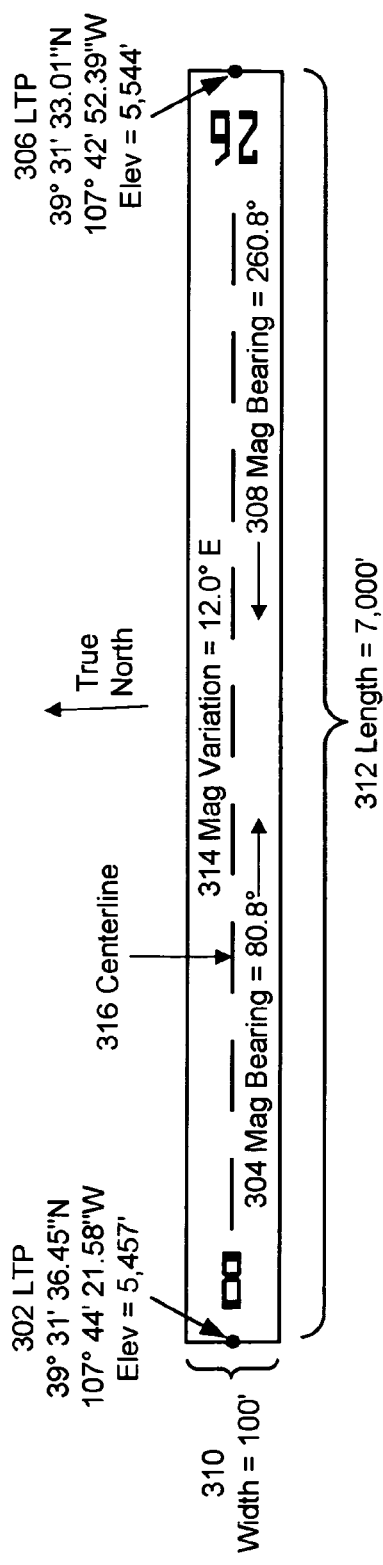
Figure 9B:
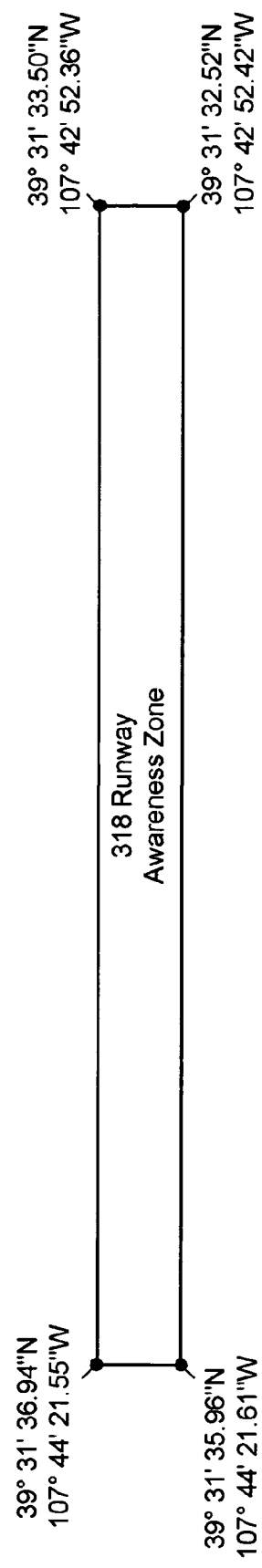

A navigation reference data source 130 may be employed for delineating the boundaries of a runway awareness zone. In one embodiment, runway information contained in a runway record from a flight navigation database 132 employing standards of the ARINC 424 specification could be used to derive four corners of a runway awareness zone from which the boundaries could be delineated. For example, fields of the runway record include data representative of, but not limited to, an LTP, the elevation of the LTP, runway width, the magnetic bearing, and the magnetic variation of the runway. The data associated with Runways 8-26, rounded off pursuant to the ARINC specification, is shown in FIG. 9A. The data indicates that the LTP 302 for Runway 8 is located at lat. 39° 31'36.45"N., long. 107° 44'21.58"W and has an elevation of 5,547' mean sea level ("MSL"); the magnetic bearing 304 of the runway is 80.8°. The data indicates that the LTP 306 for Runway 26 is located at lat. 39° 31'33.01"N, long. 107° 42'52.39"W and has an elevation of 5,544' MSL; the magnetic bearing 308 of the runway is 260.8°. The data indicates that the width 310 of Runways 8-26 is 100', the length 312 is 7,000', and magnetic variation 314 is 12.0° E.

There are a plurality of techniques in which a runway awareness zone may be determined from which a manufacturer or end-user may choose in establishing a runway awareness zone. In one embodiment, four corners of Runways 8-26 may be determined using the data of LTP 302, LTP 306, and width 310 by applying one or more formulas known to those skilled in the art, where LTP 302 and LTP 306 may be used to determine a runway centerline 316 from which half of the width 310 may be applied to each side of the centerline. The determination of the location of the four corners may be used to delineate the boundaries of a runway awareness zone 318. As shown in FIG. 6B, the runway awareness zone boundaries are delineated by latitude/longitude coordinates of the locations of the four corners. These boundaries could be used for either Runway 8 or Runway 26. Although not shown, it should be noted that the application of a great circle formula renders the length of Runways 8-26 to be 6,997.30°.

In an alternative embodiment, the four corners used to delineated boundaries of a runway awareness zone for Runway 8 may be established with a derivation technique using LTP 302, magnetic bearing 304, runway width 310, runway length 312, and magnetic variation 314 by applying one or more formulas, where a runway centerline 316 may be projected from the LTP 302 for a distance of runway length 312 in a true direction determined using magnetic bearing 304 and magnetic variation 314. Once the runway centerline has been determined, width 310 may be applied to each side of the centerline. The application of this technique would render a different runway awareness zone than in the preceding paragraph due, in part, to the rounding errors. Similarly, the four corners used to delineated boundaries of a runway awareness zone for Runway 26 may be determined using LTP 306, magnetic bearing 308, runway width 310, runway length 312, and magnetic variation 314. It should be noted that separate application of the technique for Runway 8 and Runway 26 discussed in this paragraph may render a different runway awareness zone for each runway which may, in turn, be different from the runway awareness zone determined in the preceding paragraph. As such, the manufacturer or end-user is provided with the flexibility of choosing which technique(s) to apply.

Although the preceding discussion has drawn from record fields established in accordance with a specific ARINC specification, the embodiments herein are not limited to the specification or those specific record fields discussed. Rather, the preceding discussion has provided examples of how a field or fields of a specific record could be used to establish a runway awareness zone. Although the ARINC specification provides detailed record formats, those skilled in the art will readily acknowledge that aviation standards such as those published by ARINC may be modified with subsequent changes, amendments, or revisions. The embodiments and discussion herein with respect to any ARINC specification are illustrations intended solely to provide examples and are in no way intended to be limited to those discussed and presented herein.

It should be noted that, as embodied herein, employing a derivation technique to establish a runway awareness zone may not be necessary when data provided by one or more data sources may already be representative of a runway awareness zone; for example, the latitude/longitude coordinates used for delineating the boundaries a runway awareness zone could be provided by one or more data sources. Also, the employment of a derivation technique which establishes a partitioned runway awareness zone may not be necessary when data provided by one or more data sources may already be representative of partitioned runway awareness zone; for example, the latitude/longitude coordinates used for delineating the boundaries a partitioned runway awareness zone could be provided by one or more data sources. The establishment and/or use of a partitioned runway awareness zone is described in a U.S. Patent Application by Rathinam et al filed concurrently with the instant application, entitled "System, Module, and Method for Presenting Runway Traffic Information," and identified by Ser. No. 12/322,442, which is incorporated by reference in its entirety. As embodied herein, a runway awareness zone and/or a partitioned runway awareness zone may be established in the plurality of ways.

In an additional embodiment, a runway awareness zone may include a buffer zone by, for example, extending a runway centerline and/or expanding with width of a runway. As embodied herein, a manufacturer or end-user may have a plurality of options from which to choose how a runway awareness zone may incorporate a buffer zone. For the purpose of illustration and not limitation, examples of how a runway awareness zone may include a buffer zone will be discussed.

Figure 9C:
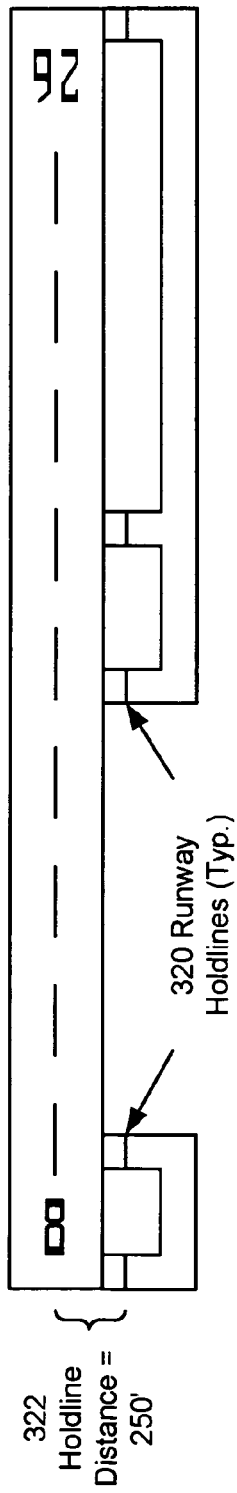

A buffer zone could extend a runway centerline by including a displaced threshold. Known to those skilled in the art, a value of the distance of a displaced threshold may be included as a field in a runway record in a database. Also, a buffer zone could expand the width of the runway to include the distance of one or more runway holdlines. FIG. 9C illustrates holdlines 320 of taxiways adjacent to Runways 8-26. The distance between the runway centerline and holdlines 322 is shown to be 250'.

In one embodiment, a navigation reference data source 130 may be employed in determining the category of a runway for the purposes of locating holdlines. In one embodiment, a navigation reference data source 130 could be any database from which an assigned distance holdline may be provided; the latitude/longitude locations of one or more holdlines may be provided; or approach visibility minimums, airplane design group, and aircraft category assigned to the runway may be provided from which a processor may be programmed to determined the distance.

In an alternative embodiment, a navigation reference data source 130 could be any database including, but not limited to, a flight navigation database 132 from which holdline distances may be estimated or approximated using some of the records conforming to the ARINC 424 specification. Such estimation may provide an ascertainable basis for which a buffer could be determined and included in a runway awareness zone. For instance, approach visibility minimums stated in the Advisory Circular may correspond to whether or not the approach is categorized as a precision approach or non-precision approach, where precision approaches could generally be considered as allowing visibility conditions that are less than ¾-statute mile and non-precision approaches could be generally considered as requiring visibility conditions not lower than ¾-statute mile.

Using ARINC 424 database records, an "IFR Capability" field of an airport record could be used to determine the presence of any published instrument approach procedures; if no instrument approach procedures have been published, then each runway at the airport could be categorized as a runway having approach visibility minimums equal to or greater than ¾-statute mile.

In another example, an "ILS/MLS/GLS Category" field of a runway record could be used to indicate the presence of a precision approach runway; if one is present, then the runway could be assigned as a runway having approach visibility minimums lower than ¾-statute mile. In another example, the "Approach Route Identifier" field of an airport approach record could be used to identify whether an established instrument approach procedure of a runway is a precision or non-precision approach. If the procedure is a precision approach, then the runway could be assigned as a runway having approach visibility minimums lower than ¾-statute mile; if the procedure is not a precision approach, then the runway could be categorized as a runway having approach visibility minimums equal to or greater than ¾-statute mile.

With respect to airplane design group criteria, a runway width field of a runway record may be used to identify the airplane design group for which the runway has been designed; if two or more groups share the same width, then the manufacturer or end-user may choose or select criteria from which to determine the airplane design group; for example, the group corresponding to the largest size of aircraft may be chosen or selected. With respect to category of aircraft criteria, the presence or lack of data in fields related to decision heights or minimum descent altitudes associated with the categories of an airport approach record (e.g., CAT D Decision Height, CAT B Minimum Descent Altitude, etc. . . . ) could be used to identify the category of aircraft for which the runway has been designed.

As stated above, holdline distances may be estimated or approximated using some of the records provided under the ARINC 424 specification. Data contained in a plurality of records indicating the presence of a precision approach for a runway (which may correspond to approach visibility minimums), a numerical runway width (which may correspond to airplane design group), and categories of aircraft approach may be employed to determine the applicable distance between the runway centerline and holdline pursuant to Advisory Circular criteria. The results of such estimation or approximation may be used for including a buffer in an expansion of a runway awareness zone.

It should be noted that, as embodied herein, employing a derivation technique to establish a runway awareness zone with a buffer may not be necessary when data provided by one or more data sources may already be representative of a runway awareness zone which includes a buffer. Also, employing a derivation technique to establish a partitioned runway awareness zone with a buffer may not be necessary when data provided by one or more data sources may already be representative of partitioned runway awareness zone. As embodied herein, a runway awareness zone and/or a partitioned runway awareness zone may be established in the plurality of ways.

Figure 9D:
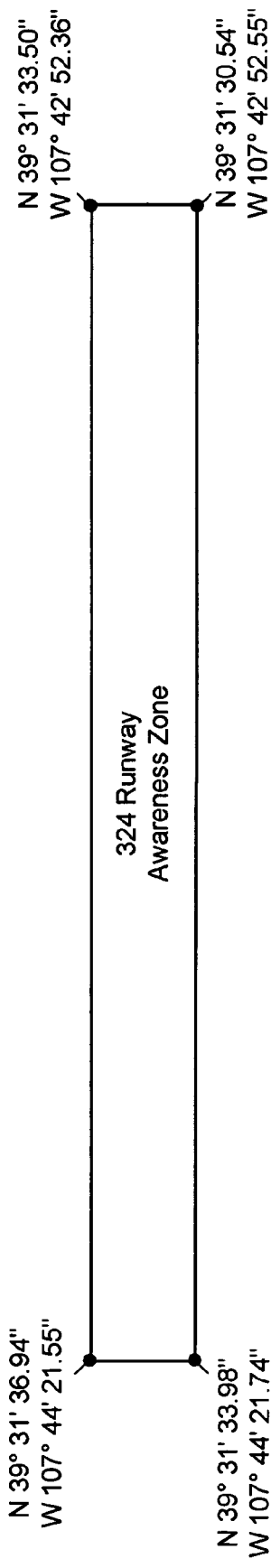
Figure 9E:
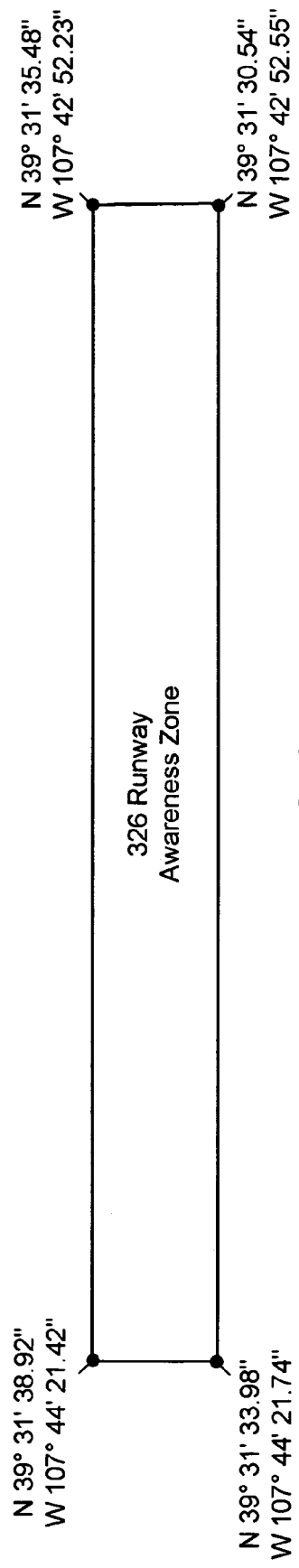

The drawings of FIGS. 9C through 9E illustrate a runway awareness zone which includes a buffer by expanding the distance from the centerline to include holdlines 320. As discussed above, holdline distance 322 could be the distance assigned to Runways 8-26, the value of which (i.e., 250') may be stored in a database of a navigation reference data source 130. Alternatively, this distance could be an estimated or approximated distance derived using approach and runway records of a database of a navigation reference data source 130 as discussed above, and applying the data stored in the records to the criteria specified in the Advisory Circular.

In one embodiment, if the actual locations (e.g., latitude/longitude coordinates) of the holdlines are not provided by a navigation reference data source 130, the lower corners (as shown in FIG. 9D) of a runway awareness zone of Runways 8-26 which includes a buffer may be determined using the data of LTP 302, LTP 306, and holdline distance 322 by applying one or more formulas, where LTP 302 and LTP 306 may be used to determine a runway centerline from which half of the holdline distance 322 may be applied to the holdline side of the centerline. The latitude/longitude coordinates of the corners that are associated with the holdlines are shown in FIG. 9D. It should be noted that the latitude/longitude coordinates of the corners associated with the runway (shown as the upper corners in FIG. 9D) have not changed because the technique has been applied to the holdline side of the centerline only. The determination of the location of the four corners may be used to delineate the boundaries of a runway awareness zone 324. These boundaries could be used for either Runway 8 or Runway 26.

In an alternative embodiment, a manufacturer may apply the technique of the preceding paragraph to both sides of the runway centerline equally even though holdlines are present on one side of the runway centerline only. If so, the corners of a runway awareness zone which includes a buffer may be determined using the data of LTP 302, LTP 306, and holdline distance 322 by applying one or more formulas, where LTP 302 and LTP 306 may be used to determine a runway centerline from which half of the holdline distance 322 may be applied to each side of the centerline. The latitude/longitude coordinates of the locations of the four corners of a runway awareness zone 326 are shown in FIG. 9E. As shown in FIG. 9E, the runway awareness zone boundaries are delineated by the locations of the four corners. These boundaries could be used for either Runway 8 or Runway 26.

In an alternative embodiment, the technique discussed above may be modified for determining runway awareness zone with a buffer, substituting holdline distance for runway width. The four corners of a runway awareness zone may be determined using the LTP, magnetic bearing, runway length, and magnetic variation by applying one or more formulas, where a runway centerline may be projected from the LTP for a distance of runway length in a true direction determined using magnetic bearing and magnetic variation; instead of runway width as discussed above, however, the holdline distance may be applied to one or both sides of the centerline once the runway centerline has been determined. Then, the locations of the corners may be determined from which the boundaries of a runway awareness zone may be defined. As noted above, the results from the application of this technique may apply to one runway only.

In an embodiment herein, a runway awareness zone may include a vertical buffer which includes, for instance, airspace in which aircraft are taking-off and/or landing. As embodied herein, a manufacturer or end-user may have the option of choosing or selecting the height at which a ceiling could be established for such airspace including, but not limited to, an airspace established by an aviation-governing authority for providing an obstacle-free zone above a runway. For example, the FAA provides for a runway obstacle-free zone in the Advisory Circular, where such runway obstacle-free zone includes airspace above the runway below 150' above the established airport elevation and centered on the runway centerline.

The drawings of FIG. 10 provide another example of when traffic information may be provided to a presentation system as own-ship 330 approaches a runway awareness zone 332 corresponding to a runway and traffic 334. As embodied in the drawings of FIG. 10, one or more advisory spacings that could be programmed or configured by a manufacturer or end-user. Each advisory spacing could correspond to a non-alert and/or one or more alerts, where such alerts may be based on level of threat or conditions requiring immediate crew awareness or attention. As used in the following discussion, first advisory spacing 338 could correspond to a non-alert zone, second advisory spacing 340 could correspond to a caution alert zone, and third advisory spacing 342 could correspond to a warning alert zone.

It should be noted that advisory spacings could be established as fixed measurements and/or variable measurements where such variables could include, but are not limited to, time and/or speed. A manufacturer or end-user may configure one or more advisory spacings as a function of time spacing between an own-ship and a target. For the purpose of illustration and not limitation, spacing of 90 seconds may be selected by a manufacturer or end-user for the generation and/or presentation of a first advisory level (e.g., non-alert advisory), 45 seconds for a second alert advisory (e.g., caution), and 15 seconds for a third alert advisory (e.g., warning). For an own-ship operating at a speed of 120 knots, boundaries corresponding to the different levels of advisories would be equivalent to 3.0 nautical miles ("NM"), 1.5 NM, and 0.5 NM, respectively.

Figure 10A:
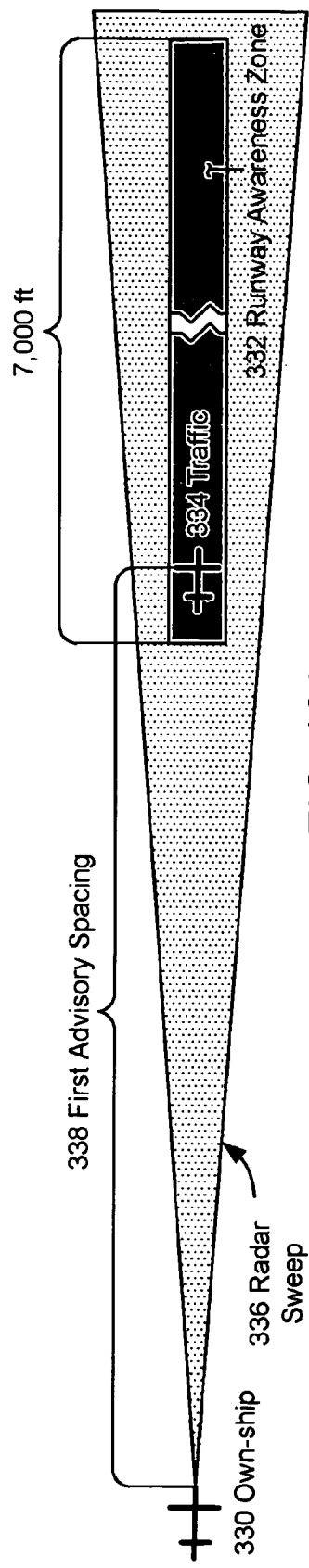

As shown in FIG. 10A, own-ship 330 is located a distance from traffic 334 corresponding to a first advisory spacing 338, and traffic 334 is located within a runway awareness zone 332. Using radar azimuth and range data of traffic, aircraft position and/or geographic position of own-ship, and/or track alignment correction information, traffic location may be determined by a processor 150. If traffic 334 is located within a runway awareness zone 332, advisory data representative of traffic advisory information of traffic 334 may be generated such that advisory data could be provided to one or more avionics systems.

In one embodiment, advisory data may be provided to a presentation system for presenting a pilot with visual, non-textual information such as, but not limited to, symbology depicting the location of traffic on a visual display unit, where such symbology could be displayed in any color applicable for the advisory. In another embodiment, advisory data may be provided to a presentation system for presenting visual, non-textual information such as, but not limited to, highlighting or illuminating a runway depicted on a visual display unit, where such highlight or illumination could be displayed in any color applicable for the advisory. In another embodiment, advisory data may be provided to a presentation system for presenting visual, non-textual information such as, but not limited to, highlighting or illuminating part of a runway depicted on a visual display unit corresponding to a partitioned runway awareness zone occupied by traffic 334, where such highlight or illumination could be displayed in any color applicable for the advisory. In another embodiment, such advisory data which includes traffic location and/or geographic position of traffic 334 may be transmitted to other aircraft through an aircraft datalink, thereby providing a source of traffic data independently of other traffic data sources such as, but is not limited to, an ADS-B system, a TIS-B system, and ADS-R, or any combination thereof.

Similarly, advisory data may be generated and provided to a presentation system for presenting a pilot with visual, textual information on a visual display unit; for example, an applicably-colored text message "RUNWAY TRAFFIC—90 SECONDS AHEAD" or "RUNWAY TRAFFIC—3.0 NM AHEAD" could be presented visually to a pilot. As embodied herein, non-textual and textual forms could remain steady or flash intermittently, where such flashing could depend on the distance between own-ship 330 and traffic 334, where such flashing could represent a specific spacing or range to traffic 334. In addition, advisory data may be generated and provided to a presentation system for presenting a pilot with an aural non-alert advisory using an aural alert unit 166; for example, a message "RUNWAY TRAFFIC—90 SECONDS AHEAD" or "RUNWAY TRAFFIC—3.0 NM AHEAD" could be presented aurally to a pilot.

Figure 10B:
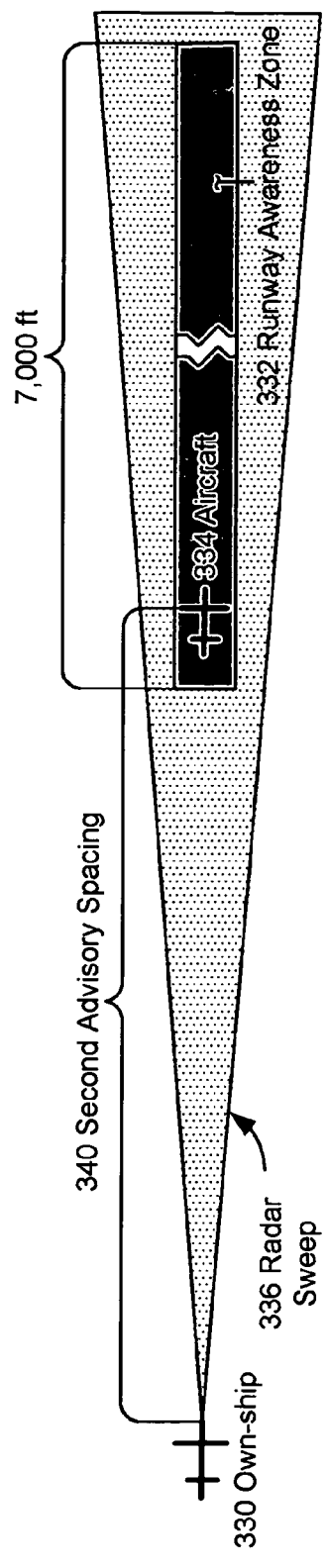

As shown in FIG. 10B, approaching own-ship 330 has moved closer to the runway and is located a distance from traffic 334 corresponding to a second advisory spacing 340. If traffic 334 is determined to be located within a runway awareness zone 332, advisory data representative of traffic advisory information of traffic 334 may be generated such that advisory data could be provided to one or more avionics systems including, but not limited to, a presentation system and a datalink system as discussed above for FIG. 10A, where such advisory data provided to a presentation system could present visual, non-textual information. Similarly, advisory data may be generated and provided to a presentation system for presenting a pilot with visual, textual information on a visual display unit; for example, an applicably-colored text message "RUNWAY TRAFFIC—45 SECONDS AHEAD" or "RUNWAY TRAFFIC—1.5 NM AHEAD" could be presented visually to a pilot. In addition, advisory data may be generated and provided to a presentation system for presenting a pilot with an aural non-alert advisory using an aural alert unit 166; for example, a message "RUNWAY TRAFFIC—45 SECONDS AHEAD" or "RUNWAY TRAFFIC—1.5 NM AHEAD" could be presented aurally to a pilot.

Figure 10C:
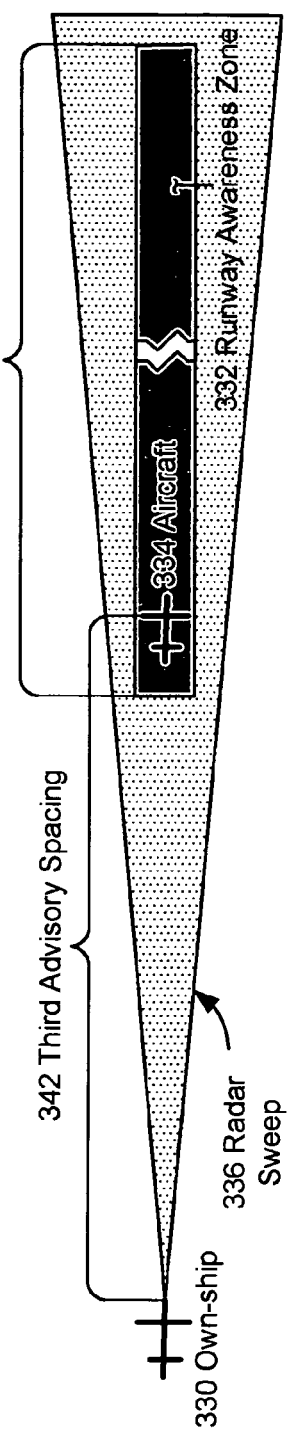

As shown in FIG. 10C, approaching own-ship 330 has moved closer to the runway and is located a distance from traffic 334 corresponding to a third advisory spacing 342. If traffic 334 is determined to be located within a runway awareness zone 332, advisory data representative of traffic advisory information of traffic 334 may be generated such that advisory data could be provided to one or more avionics systems including, but not limited to, a presentation system and a datalink system as discussed above for FIG. 10A, where such advisory data provided to a presentation system could present visual, non-textual information. Similarly, advisory data may be generated and provided to a presentation system for presenting a pilot with visual, textual information on a visual display unit; for example, an applicably-colored text message "RUNWAY TRAFFIC—15 SECONDS AHEAD" or "RUNWAY TRAFFIC—0.5 NM AHEAD" could be presented visually to a pilot. In addition, advisory data may be generated and provided to a presentation system for presenting a pilot with an aural non-alert advisory using an aural alert unit 166; for example, a message "RUNWAY TRAFFIC—15 SECONDS AHEAD" or "RUNWAY TRAFFIC—0.5 NM AHEAD" could be presented aurally to a pilot.

FIG. 11 depicts a flowchart 400 of an example of a method for generating airport surface traffic information. The flowchart begins with module 402 with the establishing of a runway awareness zone of a runway. In one embodiment, a runway awareness zone may be own-ship-based. A runway awareness zone may be comprised of one or more advisory zones with each having one or more fixed- or variably-measured boundaries as discussed above. Each advisory zone could correspond to a non-alert and/or one or more alerts, where such alerts may be based on level of threat or conditions requiring immediate crew awareness or attention. As discussed above, an advisory zone could correspond to a non-alert zone, a caution alert zone, and/or a warning alert zone. Each runway advisory zone may be, one more fixed- or variably-measured zones In another embodiment, a runway awareness zone may be established using a navigation reference data provided by a navigation reference data source 130. For such runway awareness zone, one or more fixed- or variably-measured advisory spacings may be established by a processor 150, where each advisory spacing could correspond to a non-alert and/or one or more alerts, where such alerts may be based on level of threat or conditions requiring immediate crew awareness or attention. As discussed above, an advisory spacing could correspond to a non-alert spacing, a caution alert spacing, and/or a warning alert spacing.

Navigation reference data may be comprised of data representative of runway information including, but not limited to, at least LTP, the elevation of the LTP, runway width, the magnetic bearing, and the magnetic variation of the runway, which may be received by a processor, either in part or in whole, to establish a runway awareness zone. Alternatively, data representative of a runway awareness zone may be received by a processor, thereby establishing a partitioned runway awareness zone.

A runway awareness zone established using navigation reference data could provide a buffer zone by extending and/or expanding beyond the boundaries of a runway including, but not limited to, adding displaced threshold information contained in the navigation reference data and/or adding runway holdline information, respectively, where such holdline information could be contained by navigation reference data or estimated using navigation reference data. Also, an altitude above the runway could be established as a ceiling for the runway awareness zone.

The flowchart continues with module 404 with the receiving of traffic data from a forward-looking radar system 140. Such data could include data representative of range, azimuth, and/or elevation of each target. An embodied herein, a forward-looking radar system 140 may calculate aircraft track angle or track alignment correction information directly from information contained within radar return signals.

The flowchart continues with an optional module 406 with the receiving of navigation data. Navigation data could include heading 122 and track 124. As embodied herein, track 124 could comprise actual track over the surface of the Earth or track alignment correction information. In another embodiment, navigation data could include geographic position 112 and/or altitude 114. Navigation data 110 could be used in conjunction with location data of airport surface traffic acquired by a forward-looking radar system 140 to determine latitude/longitude location and/or altitude of airport surface traffic.

The flowchart continues with module 408 with the generation of an advisory data set based upon navigation data associated with track alignment correction information and airport surface traffic located within the runway awareness zone. As embodied herein, navigation data may be provided to a processor 150 as a direct input from a source of navigation data or navigation data such as, but not limited to, heading 122 and ground track 124 may be determined by processor 150 as inputs from which a ground track alignment correction information can be determined. Track alignment correction information may be applied to traffic data, a runway awareness zone, or both. Then, a processor 150 may generate an advisory data set by determining the traffic data located within the runway awareness zone after the application of track alignment correction information.

An advisory data set may be representative of advisory data of the traffic located with the runway awareness zone. As embodied herein, the generation of the advisory data set could depend on an avionics system being provided with the advisory data set. Such avionics systems could include, but are not limited to, a presentation system 160 and an external communication system 170.

In one embodiment, if the advisory data set is provided to one or more visual display units 162 of a presentation system 160, the advisory data set could be generated with advisory data representative of airport surface traffic location information, where such information may be determined by processor 150 and based on azimuth and/or range data acquired from a forward-looking radar system 140 and track alignment correction information; if navigation data associated with position of own-ship has been provided to a processor 150 and used in conjunction with location data of acquired by a forward-looking radar system 140 and track alignment correction information, airport surface traffic location could include latitude/longitude location and/or altitude of airport surface traffic. Advisory data could be presented to one or more visual display units for presenting a recipient (e.g., a pilot) with visual, non-textual information such as, but not limited to, symbology depicting the location of traffic on a visual display unit, where such symbology could be displayed in any color applicable for the advisory.

The advisory data set could be generated with advisory data representative of visual, textual information of airport surface traffic. Such advisory data could be provided to one or more visual display units for presenting visual, non-textual information such as, but not limited to, an applicably-colored text message to a recipient. As embodied herein, advisory data set could be generated with advisory data that, when provided to one or more visual display units, could control the displayed depiction, e.g., remain steady or flash intermittently.

In another embodiment, if an advisory data set is provided to an aural alert unit 166 of a presentation system 160, the advisory data set may be generated with advisory data representative of aural information of airport surface traffic. Such advisory data could be presented to an aural alert unit for presenting a recipient with an applicable aural alert. In another embodiment, if an advisory data set is provided to a tactile alert unit 168 of a presentation system 160, the advisory data set may be generated with advisory data representative of tactile advisory. Such advisory data could be presented to a tactile alert unit for presenting a pilot with a tactile alert such as, but not limited to, a "stick-shaker" presented to a recipient.

As stated above, advisory data set could be generated with advisory data representative of airport surface traffic location information, where such surface traffic location could include latitude/longitude and/or altitude information. As embodied herein, such advisory data set could be provided to an external communication system such as, but not limited to, a datalink system, where such system transmits the advisory data set to at least one external recipient. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating airport surface traffic information, said system comprising:
   a forward-looking aircraft radar system; and
   a processor, operatively coupled to receive data, where such processor is configured to
      establish a runway awareness zone,
      receive traffic data representative of airport surface traffic from the forward-looking aircraft radar system, and
      generate an advisory data set based upon track alignment correction information and airport surface traffic located within the runway awareness zone, wherein the advisory data set comprises advisory data representative of at least one of the following: visual advisory information, aural advisory information, and tactile advisory information.

2. The system of claim 1, wherein data acquired by the forward-looking aircraft radar system is used in determining track alignment correction information.

3. The system of claim 1, further comprising:
   a source of navigation data, and
   the processor, operatively coupled to receive navigation data, is further configured to
      receive the navigation data, whereby
         the navigation data is used in determining track alignment correction information, latitude and longitude of the airport surface traffic, or both.

4. The system of claim 3, further comprising:
   an external communication system, operatively coupled to receive data from the processor, where the external communication system is configured to
      receive the advisory data set, where
         the processor is further configured to provide the advisory data set to the external communication system.

5. The system of claim 1, wherein the advisory data representative of visual advisory information includes data representative of non-textual information, textual information, or both.

6. The system of claim 1, wherein
   the runway awareness zone comprises of at least one advisory zone having at least one fixed- or variably-measured boundary, where
      each advisory zone corresponds to a level of threat, and
      the advisory data set is generated to include advisory data representative of the level of threat of corresponding airport surface traffic.

7. The system of claim 6, further comprising:
   a presentation system, operatively coupled to receive data from the processor, where such presentation system is configured to
      receive the advisory data set, and
      present traffic advisory information represented in the advisory data set to a recipient, where
         the processor is further configured to provide the advisory data set to the presentation system, wherein the presentation system comprises at least one of the following: a visual display unit, an aural alert unit, and a tactile alert unit.

8. The system of claim 7, further comprising:
   a source of navigation data, and
   the processor is further configured to
      receive the navigation data, whereby
         the navigation data is used in determining track alignment correction information, latitude and longitude of the airport surface traffic, or both.

9. The system of claim 1, further comprising:
   a source of navigation reference data;
   a source of navigation data; and
   the processor is further configured to
      receive navigation reference data, and
      receive the navigation data, whereby the navigation reference data is used in establishing the runway awareness zone, and the navigation data is used in determining track alignment correction information, latitude and longitude of the airport surface traffic, or both.

10. The system of claim 9, further comprising:
an external communication system, operatively coupled to receive data from the processor, where the external communication system is configured to
receive the advisory data set, where
the processor is further configured to provide the advisory data set to the external communication system.

11. The system of claim 9, wherein the processor is further configured to
establish at least one fixed- or variably-measured advisory spacing, where
each advisory spacing corresponds to a level of threat, and
the advisory data set is generated to include advisory data representative of the level of threat of corresponding airport surface traffic.

12. The system of claim 11, further comprising:
a presentation system, operatively coupled to receive data from the processor, where such presentation system is configured to
receive the advisory data set, and
present traffic advisory information represented in the advisory data set to a recipient, where
the processor is further configured to provide the advisory data set to the presentation system, wherein the presentation system comprises at least one of the following: a visual display unit, an aural alert unit, and a tactile alert unit.

13. The system of claim 1, wherein the processor is a processor of at least one of the following: the forward-looking aircraft radar system, a source of navigation data, a presentation system, a source of navigation reference data, and an external communications system.

14. A module for generating airport surface traffic information, said module comprising:
an input communications interface to facilitate the receiving of data by a processor; and
a processor, operatively coupled to receive data, where such processor is configured to
establish a runway awareness zone,
receive traffic data representative of airport surface traffic from the forward-looking aircraft radar system, and
generate an advisory data set based upon track alignment correction information and airport surface traffic located within the runway awareness zone, wherein the advisory data set comprises advisory data representative of at least one of the following: visual advisory information, aural advisory information, and tactile advisory information.

15. The module of claim 14, wherein data acquired by the forward-looking aircraft radar system is used in determining track alignment correction information.

16. The module of claim 14, wherein the processor is further configured to
receive navigation data, whereby
the navigation data is used in determining track alignment correction information, latitude and longitude of the airport surface traffic, or both.

17. The module of claim 16, further comprising:
an output communications interface to facilitate the providing of data from the processor, where
the processor is further configured to provide the advisory data set to an external communication system.

18. The module of claim 14, wherein the advisory data representative of visual advisory information includes data representative of non-textual information, textual information, or both.

19. The module of claim 14, wherein
the runway awareness zone comprises of at least one advisory zone having at least one fixed- or variably-measured boundary, where
each advisory zone corresponds to a level of threat, and
the advisory data set is generated to include advisory data representative of the level of threat of corresponding airport surface traffic.

20. The module of claim 19, further comprising:
an output communications interface to facilitate the providing of data from the processor, where
the processor is further configured to provide the advisory data set to a presentation system, wherein the presentation system comprises at least one of the following: a visual display unit, an aural alert unit, and a tactile alert unit.

21. The module of claim 20, wherein the processor is further configured to
receive navigation data, whereby
the navigation data is used in determining track alignment correction information, latitude and longitude of the airport surface traffic, or both.

22. The module of claim 14, wherein the processor is further configured to
receive navigation reference data; and
receive navigation data, whereby
the navigation reference data is used in establishing the runway awareness zone, and
the navigation data is used in determining track alignment correction information, latitude and longitude of the airport surface traffic, or both.

23. The module of claim 22, further comprising:
an output communications interface to facilitate the providing of data from the processor, where
the processor is further configured to provide the advisory data set to an external communication system.

24. The module of claim 22, wherein the processor is further configured to
establish at least one fixed- or variably-measured advisory spacing, where
each advisory spacing corresponds to a level of threat, and
the advisory data set is generated to include advisory data representative of the level of threat of corresponding airport surface traffic.

25. The module of claim 24, further comprising:
an output communications interface to facilitate the providing of data from the processor, where
the processor is further configured to provide the advisory data set to a presentation system, wherein the presentation system comprises at least one of the following: a visual display unit, an aural alert unit, and a tactile alert unit.

26. The module of claim 15, wherein the module is a module of at least one of the following: the forward-looking aircraft radar system, a source of navigation data, a presentation system, a source of navigation reference data, and an external communications system.

27. A method for generating airport surface traffic information, said method comprising:
- establishing a runway awareness zone,
- receiving traffic data representative of airport surface traffic, and
- generating an advisory data set based upon track alignment correction information and airport surface traffic located within the runway awareness zone, wherein the advisory data set comprises advisory data representative of at least one of the following: visual advisory information, aural advisory information, and tactile advisory information.

28. The method of claim 27, wherein data acquired by a forward-looking aircraft radar system is used in determining track alignment correction information.

29. The method of claim 27, further comprising:
receiving navigation data, whereby
- the navigation data is used in determining track alignment correction information, latitude and longitude of the airport surface traffic, or both.

30. The method of claim 29, further comprising:
providing the advisory data set to the external communication system.

31. The method of claim 27, wherein the advisory data representative of visual advisory information includes data representative of non-textual information, textual information, or both.

32. The method of claim 27, wherein
the runway awareness zone comprises of at least one advisory zone having at least one fixed- or variably-measured boundary, where
- each advisory zone corresponds to a level of threat, and
- the advisory data set is generated to include advisory data representative of the level of threat of corresponding airport surface traffic.

33. The method of claim 32, further comprising:
providing the advisory data set to a presentation system.

34. The method of claim 33, further comprising:
receiving navigation data, whereby
- the navigation data is used in determining track alignment correction information, latitude and longitude of the airport surface traffic, or both.

35. The method of claim 27, further comprising:
receiving navigation reference data, and
receiving navigation data, whereby
- the navigation reference data is used in establishing the runway awareness zone, and
- the navigation data is used in determining track alignment correction information, latitude and longitude of the airport surface traffic, or both.

36. The method of claim 35, further comprising:
providing the advisory data set to the external communication system.

37. The method of claim 35, further comprising:
establishing at least one fixed- or variably-measured advisory spacing, where
- each advisory spacing corresponds to a level of threat, and
- the advisory data set is generated to include advisory data representative of the level of threat of corresponding airport surface traffic.

38. The method of claim 37, further comprising:
providing the advisory data set to a presentation system.

* * * * *